(12) United States Patent
Arai et al.

(10) Patent No.: US 9,951,239 B2
(45) Date of Patent: Apr. 24, 2018

(54) INK SET AND IMAGE FORMING METHOD

(71) Applicant: FUJIFILM CORPORATION, Minato-ku, Tokyo (JP)

(72) Inventors: Takuya Arai, Kanagawa (JP); Katsuhiro Shimono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 79 days.

(21) Appl. No.: 15/003,801

(22) Filed: Jan. 22, 2016

(65) Prior Publication Data
US 2016/0222238 A1 Aug. 4, 2016

(30) Foreign Application Priority Data

Jan. 29, 2015 (JP) .................. 2015-015809
Mar. 27, 2015 (JP) .................. 2015-067529

(51) Int. Cl.
*C09D 11/54* (2014.01)
*B41M 5/00* (2006.01)
*C09D 11/38* (2014.01)
*C09D 11/10* (2014.01)
*C09D 11/40* (2014.01)
*C09D 11/102* (2014.01)
*B41M 7/00* (2006.01)

(52) U.S. Cl.
CPC ........... *C09D 11/38* (2013.01); *B41M 5/0017* (2013.01); *C09D 11/10* (2013.01); *C09D 11/102* (2013.01); *C09D 11/40* (2013.01); *C09D 11/54* (2013.01); *B41M 7/00* (2013.01)

(58) Field of Classification Search
CPC .................................................. C09D 11/54
See application file for complete search history.

(56) References Cited

U.S. PATENT DOCUMENTS

| | | | | |
|---|---|---|---|---|
| 2010/0144943 A1* | 6/2010 | Sakai | ...................... | C09D 11/38 524/320 |
| 2010/0166962 A1* | 7/2010 | Ohzeki | .................. | C09D 11/40 427/256 |
| 2010/0203247 A1* | 8/2010 | Kariya | .................. | C09D 11/322 427/256 |
| 2010/0236447 A1* | 9/2010 | Sakai | ................... | C09D 11/322 106/31.6 |
| 2012/0320121 A1* | 12/2012 | Arai | ...................... | C09D 11/322 347/20 |
| 2012/0320123 A1* | 12/2012 | Takeda | .................. | C09D 11/322 347/21 |
| 2013/0169724 A1* | 7/2013 | Gotou | .................. | B41M 5/0017 347/100 |

FOREIGN PATENT DOCUMENTS

| | | |
|---|---|---|
| EP | 2196506 A1 | 6/2010 |
| JP | 3583257 B2 | 11/2004 |
| JP | 3640369 B2 | 4/2005 |
| JP | 2013-18156 A | 1/2013 |
| JP | 2013-18948 A | 1/2013 |
| JP | 2013-72045 A | 4/2013 |

OTHER PUBLICATIONS

Google search for alkyl benzene sulfonate, Jun. 3, 2017.*
Extended European Search Report dated Jun. 7, 2016, issued in corresponding EP Patent Application.
English language translation of the following: Office action dated Sep. 26, 2017 from the JPO in a Japanese patent application No. 2015-067529 corresponding to the instant patent application. This office action translation is submitted now in order to supplement the understanding of the cited reference which is being disclosed in the instant Information Disclosure Statement.

* cited by examiner

*Primary Examiner* — Vu A Nguyen
(74) *Attorney, Agent, or Firm* — Solaris Intellectual Property Group, PLLC

(57) ABSTRACT

An ink set including an ink composition including resin particles, a colorant, and water, and a treatment solution including an anionic surfactant, water, and a compound configured to aggregate at least one of the colorant or the resin particles in the ink composition, in which the ratio of the content of the anionic surfactant with respect to the content of the compound configured to aggregate at least one of the colorant or the resin particles is 0.001 to 0.600 in terms of mass. An image forming method in which the ink set is used.

9 Claims, No Drawings

INK SET AND IMAGE FORMING METHOD

CROSS-REFERENCE TO RELATED APPLICATIONS

This application claims priority under 35 USC 119 from Japanese Patent Application No. 2015-015809, filed Jan. 29, 2015, and Japanese Patent Application No. 2015-067529, filed Mar. 27, 2015, the disclosures of which are incorporated herein by reference in their entireties.

TECHNICAL FIELD

The present invention relates to an ink set and an image forming method.

BACKGROUND ART

A recording method using an inkjet method is widely used since the recording method enables recording of a high quality image on various kinds of substrate by ejecting ink in droplet form from several nozzles that are placed in an inkjet head.

In image formation by an inkjet method, there is a case of using an image forming method in which an ink including a colorant is brought into contact with a treatment solution including a compound configured to aggregate components in the ink to form an image. Such an ink and a treatment solution are together used as an ink set.

For example, an ink set which includes an ink composition including resin particles and a pigment, and a treatment solution including an organic acidic compound having a specific structure, is proposed (for example, see Japanese Patent Application Laid-Open (JP-A) No. 2013-18948). It is reported that an image with suppressed graininess can be formed by using this ink set.

An ink set which includes an ink composition including a pigment and water, and a treatment solution including a water-soluble high molecular compound, an organic acidic compound, silicone oil, and water is proposed (for example, see JP-A No. 2013-72045). It is reported that, by using this ink set, not only uneven coating of the treatment solution can be suppressed but also an image with suppressed graininess can be formed.

In addition to the above, there is, for example, an ink set in which a solution for promoting image recording, which is a treatment solution for improving permeability of an ink to a substrate, is combined with an ink.

For example, an ink set which includes a recording solution (ink) and a solution for promoting image recording including a surfactant having a specific structure, a compound for thickening the recording solution, and a compound for insolubilizing a colorant is proposed (for example, see Japanese Patent Nos. 3640369 and 3583257).

SUMMARY OF INVENTION

However, when it is tried to form an image on a substrate of which surface has a high water repelling property (for example, a surface which has contact angle with water of 70° or more) by using the ink set described in JP-A No. 2013-18948 and JP-A No. 2013-72045, the liquid droplets of applied ink tend to be smaller than in the case of application to plain paper or the like, since the substrate surface has a low wetting property with water. In such state, since the treatment solution used for suppressing the graininess has the ink further, the size of a liquid droplet of the ink for forming an image tends to be smaller. Due to this, image density may decrease and striped-shaped unevenness may easily occur when a solid image is formed.

Meanwhile, regarding the ink set of Japanese Patent Nos. 3640369 and 3583257, a great amount of surfactant is included in a solution for promoting image recording, for the purpose of improving permeability of a recording solution to a substrate. Due to this, liquid droplets of the recording solution easily spread, and the applied droplets easily interfere each other. Therefore, when an image is formed using the ink set of Japanese Patent Nos. 3640369 and 3583257, an area having large liquid droplets and an area having small liquid droplets easily in an image, thus graininess of the image may develop.

The invention has been made in view of the above.

According to one embodiment of the invention, an ink set for forming an image in which density decrease in a solid image area, striped-shaped unevenness (stripe-shaped spots), and graininess are suppressed, and an image forming method are provided.

The term "solid image" in the present description means a planar image that is formed by applying an ink at a specific dot percent (density). The expression "density decrease in a solid image area" means a phenomenon that, when a solid image is formed on a substrate, the liquid droplets of an ink composition applied on the substrate have small sizes as a result of which the color density becomes lower than the intended density due to an influence from the substrate color, or a phenomenon that since the ink composition moves due to interference of the deposited ink composition droplets, as a result of which the color density becomes lower than the intended density due to an influence from the substrate color.

The expression "stripe-shaped unevenness" means a phenomenon that ejection direction deviation or the like occurs during image formation and an ink composition is deposited on a position that is different from a predetermined position, whereby stripe-shaped unevenness of density is caused, or a phenomenon that an ink composition moves due to interference of the deposited ink droplets, whereby stripe-shaped unevenness of density is caused.

The expression "graininess" means that, after an ink composition is deposited on a substrate, ink droplets are integrated with each other, whereby slight density unevenness is caused in an image and uniformity of pixels is deteriorated.

The present invention includes the following aspects.

<1> An ink set including:

an ink composition including resin particles, a colorant, and water; and a treatment solution including an anionic surfactant, water, and a compound configured to aggregate at least one of the colorant or the resin particles in the ink composition, in which a ratio of a content of the anionic surfactant with respect to a content of the compound configured to aggregate at least one of the colorant or the resin particles is 0.001 to 0.600 in terms of mass.

<2> The ink set according to <1>, in which the anionic surfactant has a hydrocarbon group in the structure thereof and a total number of carbon atoms of the hydrocarbon group is 6 or more.

<3> The ink set according to <1> or <2>, in which the anionic surfactant comprises at least one selected from the group consisting of a sulfonic acid salt and a sulfuric acid ester salt.

<4> The ink set according to any one of <1> to <3>, in which the anionic surfactant is at least one selected from the group consisting of a compound represented by the following General Formula (1) and a compound represented by the following General Formula (2)

$$R_1\text{-}L_1\text{-}A \qquad \text{General Formula (1)}$$

in which, in General Formula (1), $R_1$ represents a branched or linear alkyl group having 6 or more carbon atoms, an unsubstituted naphthyl group, an unsubstituted phenyl group, a naphthyl group substituted with at least one branched or linear alkyl group, or a phenyl group substituted with at least one branched or linear alkyl group; $L_1$ represents a single bond, an ester bond, an ether bond, an amide bond, an N-alkylamide bond, or at least one linking group selected from the following Group a; A represents $SO_3M$ or $OSO_3M$; and M represents a sodium ion or a potassium ion:

Group a

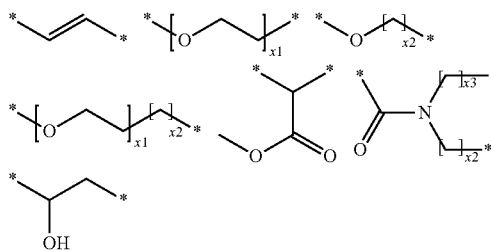

in which, in Group a, each x1 and each x2 independently represents an integer from 1 to 30; x3 represents an integer from 0 to 30; and * represents a linking position

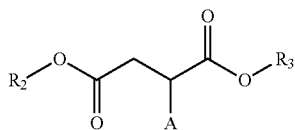

General Formula (2)

in which, in General Formula (2), each $R_2$ and each $R_3$ independently represents a branched or linear alkyl group having 3 or more carbon atoms, an unsubstituted naphthyl group, an unsubstituted phenyl group, a naphthyl group substituted with at least one branched or linear alkyl group, or a phenyl group substituted with at least one branched or linear alkyl group; A represents $SO_3M$ or $OSO_3M$; and M represents a sodium ion or a potassium ion.

<5> The ink set according to any one of <1> to <4>, in which the ratio of the content of the anionic surfactant with respect to the content of the compound configured to aggregate at least one of the colorant or the resin particles is from 0.010 to 0.250 in terms of mass.

<6> The ink set according to any one of <1> to <5>, in which the anionic surfactant is sodium dodecylbenzene sulfonate.

<7> The ink set according to any one of <1> to <6>, in which the compound configured to aggregate at least one of the colorant or the resin particles is an organic acid.

<8> The ink set according to any one of <1> to <7>, in which the treatment solution further includes at least one selected from the group consisting of silicone resin particles and silica particles.

<9> The ink set according to <8>, in which a ratio of a total content of the silicone resin particles and the silica particles with respect to a content of the anionic surfactant is from 0.0001 to 0.10 in terms of mass.

<10> An image forming method including:
a pre-treatment process of applying the treatment solution of the ink set according to any one of <1> to <9> to at least one surface of a substrate, the at least one of the substrate having a contact angle of 70° or more when 3 seconds have been elapsed after a water drop is applied thereto; and
an image forming process of forming an image by ejecting the ink composition of the ink set according to any one of <1> to <9> to the at least one surface of the substrate to which the treatment solution has been applied, using an inkjet method.

<11> The image forming method according to <10>, in which the substrate is a paper substrate having a coating layer.

One embodiment of the present invention provides an ink set and an image forming method with which an image in which density decrease in a solid image part, striped-shaped unevenness, and graininess are suppressed is formed.

DETAILED DESCRIPTION OF INVENTION

Hereinafter, the ink set and the image forming method according to the present disclosure will be explained in detail.

In the present description, the numerical range represented using "to" means a range including the numerical values described before and after "to" as the minimum and maximum values, respectively.

<Ink Set>

The ink set according to the present disclosure includes an ink composition, which includes resin particles, a colorant, and water, and a treatment solution which contains a compound configured to aggregate at least one of the colorant or the resin particles in the ink composition (hereinafter, sometimes referred to as an aggregating compound), an anionic surfactant, and water, in which the ratio of the content of the anionic surfactant with respect to the content of the compound configured to aggregate at least one of the resin particles and the colorant from 0.001 to 0.600 in terms of mass.

Although the details of the mechanism working in the present disclosure are not clear, it is conceivable that the mechanism may be as follows.

When a substrate having a water repelling property that exhibits a contact angle of as high as 70° or more 3 seconds after a water droplet is applied to a surface thereof is used, wettability of the substrate surface can be improved by applying a treatment solution in which an anionic surfactant is included. Droplets of an ink composition are deposited on the substrate surface having the improved wettability, as a result of which the sizes of the deposited liquid droplets of the ink composition do not become excessively small and the liquid droplets can spread on the substrate surface. It is conceivable that, since the aggregating compound included in the treatment solution causes aggregation of at least one of the colorant or the resin particles in the ink composition while the liquid droplets spread on the substrate surface, coalescence of the liquid droplets is prevented and the liquid droplets have desired sizes. It is conceivable that, as a result, an image that could not be formed by conventional ink sets can be obtained, that is, an image in which liquid droplets of the ink composition are arranged in desired sizes at desired positions, and density decrease in a solid image area, stripe-shaped unevenness, and graininess are suppressed can be formed.

Hereinafter, the treatment solution and the ink composition in the ink set according to the present disclosure will be explained.

<Treatment Solution>

The ink set according to the present disclosure includes a compound configured to aggregate at least one of the colorant or the resin particles in the ink composition, an anionic surfactant, and water, in which the ratio of the content of the anionic surfactant with respect to the content of the compound configured to aggregate at least one of the colorant or the resin particles is 0.001 to 0.600 in terms of mass.

The treatment solution according to the present disclosure preferably farther includes at least one of silicone resin particles or silica particles, and if necessary, may include other components.

—Anionic Surfactant—

The treatment solution according to the present disclosure includes at least one anionic surfactant.

The anionic surfactant can be appropriately selected from those already known. Examples thereof include a sulfuric acid ester salt, a sulfonic acid salt, a phosphoric acid salt, a fatty acid salt, and a formalin condensate. Examples of the cation for forming such a salt include an ammonium ion, a triethanolammoniumion, and a metal cation. Among those cations, a monovalent metal cation is more preferable, and a sodium ion or a potassium ion is particularly preferable.

Among those anionic surfactants, from the viewpoint of suppression of density decrease in a solid image part and suppression of stripe-shaped unevenness, an anionic surfactant having a hydrocarbon group in its structure in which the hydrocarbon group has a total carbon atom number of 6 or more is preferable.

The anionic surfactant having a hydrocarbon group in the structure, the hydrocarbon group having a total carbon atom number of 6 or more has a higher tendency to exhibit an effect in terms of the improving wettability of a substrate surface due to the hydrocarbon group having a total carbon atom number of 6 or more, and has an excellent effect in terms of suppressing the density decrease in a solid image area and stripe-shaped unevenness.

The hydrocarbon group preferably has a total carbon atom number of 10 or more, and still more preferably 12 or more. Although the upper limit of the total carbon atom number is not particularly limited, the upper limit is preferably 30 or less.

The total carbon atom number means, in a case in which the anionic surfactant has one hydrocarbon group present in its structure, the number of carbon atoms in the hydrocarbon group, and, in a case in which the anionic surfactant has two or more hydrocarbon groups, the total number of carbon atoms in the hydrocarbon groups present in the structure of the anionic surfactant.

The molecular weight of the anionic surfactant according to the present disclosure is preferably 5000 or less, more preferably 3000 or less, and still more preferably 1000 or less. When the molecular weight of the anionic surfactant is 5000 or less, the content ratio of the anionic group in the molecule becomes higher than that in an anionic surfactant having a molecular weight of more than 5000. Therefore, by using an anionic surfactant having a molecular weight of 5000 or less, the effect according to the present disclosure can be more effectively exhibited. Furthermore, since the viscosity of the treatment solution can be controlled within a suitable range, the occurrence of coating unevenness can be suppressed.

A molecular weight value calculated based on the molecular formula of an anionic surfactant is used for the molecular weight of the anion surfactant. In a case that the molecular weight cannot be calculated based on the molecular formula, for example, in a case that the molecular formula of an anionic surfactant is unknown, the weight average molecular weight measured using gel permeation chromatography (GPC) is used as the molecular weight of the anionic surfactant.

In the gel permeation chromatography (GPC), HLC-8020GPC (manufactured by Tosoh Corporation) is used with three columns of TSKgel Super Multipore HZ-H (manufactured by Tosoh Corporation, 4.6 mm internal diameter (ID)×15 cm), and THF (tetrahydrofuran) is used as elution liquid. The conditions are as follows: the sample concentration is 0.45% by mass, the flow rate is 0.35 ml/min, the sample injection amount is 10 μl, and the measurement temperature is 40° C., a scanning refractive index (RI) detector is used. A calibration curve is prepared from eight samples of Standard Sample TSK standard, polystyrene manufactured by Tosoh Corporation, specifically, F-40, F-20, F-4, F-1, A-5000, A-2500, A-1000, and n-propylbenzene.

From the viewpoint of exhibiting more excellent effect in terms of suppressing the density decrease in a solid image and suppressing stripe-shaped unevenness, the anionic surfactant preferably includes at least one selected from the group consisting of a sulfonic acid salt and a sulfuric acid ester salt, and more preferably contains a compound represented by the following General Formula (1) or General Formula (2).

$R_1$-$L_1$-A                              General Formula (1)

In General Formula (1), $R_1$ represents a branched or linear alkyl group having 6 or more carbon atoms, an unsubstituted naphthyl group, an unsubstituted phenyl group, a naphthyl group substituted with at least one branched or linear alkyl group, or a phenyl group substituted with at least one branched or linear alkyl group. The branched or linear alkyl group having 6 or more carbon atoms is preferably a branched or linear alkyl group having 6 to 20 carbon atoms, and is more preferably a branched or linear alkyl group having 12 to 20 carbon atoms. Examples of the branched or linear alkyl group having 6 or more carbon atoms include n-hexyl group and n-dodecyl group.

Examples of the branched or linear alkyl group substituted on the naphthyl group or the phenyl group includes an alkyl group having 1 to 20 carbon atom(s), and an alkyl group having 6 to 20 carbon atoms is preferable, and an alkyl group having 12 to 20 carbon atoms is more preferable. Examples thereof include a methyl group, an ethyl group, a propyl group, an isopropyl group, an n-hexyl group, an n-dodecyl group, and a branched dodecyl group.

In General Formula (1), $L_1$ represents a single bond, an ester bond, an ether bond, an amide bond, an N-alkylamide bond, or at least one selected from the linking group consisting of the following group a. Examples of the alkyl group included in the N-alkylamide bond include an alkyl group having 1 to 20 carbon atoms, and an alkyl group having 6 to 20 carbon atoms is preferable, and an alkyl group having 12 to 20 carbon atoms is more preferable. Examples thereof include a methyl group, an ethyl group, a propyl group, and an isopropyl group.

In General Formula (1), A represents $SO_3M$ or $OSO_3M$. M represents a sodium ion or a potassium ion.

Group a

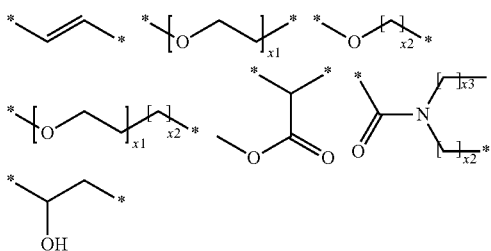

In group a, x1 and x2 each independently represent an integer from 1 to 30, x3 represents an integer from 0 to 30, and * represents a linking position.

General Formula (2)

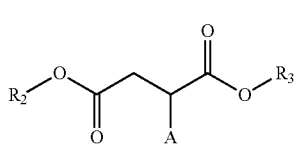

In General Formula (2), $R_2$ and $R_3$ each independently represent a branched or linear alkyl group having 3 or more carbon atoms, an unsubstituted naphthyl group, an unsubstituted phenyl group, a naphthyl group substituted with at least one branched or linear alkyl group, or a phenyl group substituted with at least one branched or linear alkyl group.

The branched or linear alkyl group having 3 or more carbon atoms is preferably a branched or linear alkyl group having 3 to 20 carbon atoms, and more preferably a branched or linear alkyl group having 12 to 20 carbon atoms. Examples thereof include an n-hexyl group, an n-octyl group, and a branched octyl group Examples of the branched or linear alkyl group substituted on the naphthyl group or the phenyl group include an alkyl group having 1 to 20 carbon atom(s), an alkyl group having 6 to 20 carbon atoms is preferable, and an alkyl group having 12 to 20 carbon atoms is more preferable. Examples thereof include a methyl group, an ethyl group, a propyl group, and an isopropyl group.

In General Formula (2), A represents $SO_3M$ or $OSO_3M$. M represents a sodium ion or a potassium ion.

Hereinafter, specific examples of the compound represented by General Formula (1) or General Formula (2) are listed.

Examples of the sulfuric acid ester salt include alkyl sulfuric acid ester salt such as sodium n-octyl sulfate, sodium 2-ethylhexyl sulfate, sodium n-decyl sulfate, sodium lauryl sulfate, sodium myristyl sulfate, sodium palmityl sulfate, sodium stearyl sulfate, sodium arachidyl sulfate, sodium behenyl sulfate, sodium oleyl sulfate, sodium linoleyl sulfate, sodium linolenyl sulfate, sodium isostearyl sulfate, sodium coconut oil alkyl sulfate, sodium palm oil alkyl sulfate, sodium palm seed oil alkyl sulfate, sodium soy bean oil alkyl sulfate, potassium n-octyl sulfate, potassium 2-ethylhexyl sulfate, potassium n-decyl sulfate, potassium lauryl sulfate, potassium myristyl sulfate, potassium palmityl sulfate, potassium stearyl sulfate, potassium arachidyl sulfate, potassium behenyl sulfate, potassium oleyl sulfate, potassium linoleyl sulfate, potassium linolenyl sulfate, potassium isostearyl sulfate, potassium coconut oil alkyl sulfate, potassium palm oil alkyl sulfate, potassium palm seed oil alkyl sulfate, and potassium soy bean oil alkyl sulfate; and polyoxyethylene alkyl ether sulfate salts such as sodium polyoxyethylene (average addition mole number of oxyethylene group (EO): from 1 to 5)-n-octyl ether sulfate, sodium polyoxyethylene (EO average addition mole number: from 1 to 5)-2-ethylhexyl ether sulfate, sodium polyoxyethylene (EO average addition mole number: from 1 to 5)-n-decyl ether sulfate, sodium polyoxyethylene (EO average addition mole number: from 1 to 5) lauryl ether sulfate, sodium polyoxyethylene (EO average addition mole number: from 1 to 5) myristyl ether sulfate, sodium polyoxyethylene (EO average addition mole number: from 1 to 5) palmityl ether sulfate, sodium polyoxyethylene (EO average addition mole number: from 1 to 5) stearyl ether sulfate, sodium polyoxyethylene (EO average addition mole number: from 1 to 5) arachidyl ether sulfate, sodium polyoxyethylene (EO average addition mole number: from 1 to 5) behenyl ether sulfate, sodium polyoxyethylene (EO average addition mole number: from 1 to 5) oleyl ether sulfate, sodium polyoxyethylene (EO average addition mole number: from 1 to 5) linoleyl ether sulfate, sodium polyoxyethylene (EO average addition mole number: from 1 to 5) linolenyl ether sulfate, sodium polyoxyethylene (EO average addition mole number: from 1 to 5) isostearyl ether sulfate, sodium polyoxyethylene (EO average addition mole number: from 1 to 5) coconut oil alkyl ether sulfate, sodium polyoxyethylene (EO average addition mole number: from 1 to 5) palm oil alkyl ether sulfate, sodium polyoxyethylene (EO average addition mole number: from 1 to 5) palm seed oil alkyl ether sulfate, and sodium polyoxyethylene (EO average addition mole number: from 1 to 5) soy bean oil alkyl ether sulfate, potassium polyoxyethylene (EO average addition mole number: from 1 to 5)-n-octyl ether sulfate, potassium polyoxyethylene (EO average addition mole number: from 1 to 5)-2-ethylhexyl ether sulfate, potassium polyoxyethylene (EO average addition mole number: from 1 to 5)-n-decyl ether sulfate, potassium polyoxyethylene (EO average addition mole number: from 1 to 5) lauryl ether sulfate, potassium polyoxyethylene (EO average addition mole number: from 1 to 5) myristyl ether sulfate, potassium polyoxyethylene (EO average addition mole number: from 1 to 5) palmityl ether sulfate, potassium polyoxyethylene (EO average addition mole number: from 1 to 5) stearyl ether sulfate, potassium polyoxyethylene (EO average addition mole number: from 1 to 5) arachidyl ether sulfate, potassium polyoxyethylene (EO average addition mole number: from 1 to 5) behenyl ether sulfate, potassium polyoxyethylene (EO average addition mole number: from 1 to 5) oleyl ether sulfate, potassium polyoxyethylene (EO average addition mole number: from 1 to 5) linoleyl ether sulfate, potassium polyoxyethylene (EO average addition mole number: from 1 to 5) linolenyl ether sulfate, potassium polyoxyethylene (EO average addition mole number: from 1 to 5) isostearyl ether sulfate, potassium polyoxyethylene (EO average addition mole number: from 1 to 5) coconut oil alkyl ether sulfate, potassium polyoxyethylene (EO average addition mole number: from 1 to 5) palm oil alkyl ether sulfate, potassium polyoxyethylene (EO average addition mole number: from 1 to 5) palm seed oil alkyl ether sulfate, and potassium polyoxyethylene (EO average addition mole number: from 1 to 5) soy bean oil alkyl ether sulfate.

Examples of the sulfonic acid salts include: alkyl sulfonic acid salts such as sodium n-hexyl sulfonate, sodium 2-ethylhexyl sulfonate, sodium heptyl sulfonate, sodium n-octyl sulfonate, sodium nonyl sulfonate, sodium decyl sulfonate, sodium undecyl sulfonate, sodium dodecyl sulfonate, sodium linear dodecylbenzene sulfonate, and sodium branched dodecylbenzene sulfonate; alkyl sulfonic acid salts containing one or more ethylene oxide chains such as sodium 5,8,11-trioxapentadecane-1-sulfonate, sodium 5,8,11-trioxaheptadecane-1-sulfonate, sodium 13-ethyl-5,8,11-trioxaheptadecane-1-sulfonate, and sodium 5,8,11,14-tetraoxatetradecoic acid-1-sulfonate; aryl sulfonic acid salts such as sodium benzene sulfonate, sodium p-toluene sulfonate, or sodium p-styrene sulfonate; and dialkyl sulfosuccinic acid salts such as di-1,3-dimethylbutyl sulfosuccinate sodium salt, di-1-methylpentyl sulfosuccinate sodium salt, and di-2-ethylhexyl sulfosuccinate sodium salt. Sodium contained in the sulfonic acid salts listed above may be replaced with potassium.

In addition to the compound represented by General Formula (1) or General Formula (2), the compounds indicated below can be also used as anionic surfactants.

Specific examples include an alkyl sulfuric acid ester salt in which the sodium contained in any of the alkyl sulfuric acid ester salts described above is replaced with ammonium or triethanolammonium, a polyoxyethylene alkyl ether sulfuric acid salt in which sodium contained in the polyoxyethylene alkyl ether sulfuric acid salt is replaced with ammonium or triethanolammonium, a sulfonate salt in which sodium contained in the sulfonate salt is replaced with lithium, alkyl sulfonate salt such as sodium propylsulfonate, sodium n-butylsulfonate, sodium pentylsulfonate, or sodium cyclohexylsulfonate, and an aryl sulfonate salt such as sodium p-hydroxybenzenesulfonate, sodium isophthalic acid dimethyl-5-sulfonate, sodium 1-naphthyl sulfonate, sodium 4-hydroxynaphthylsulfonate, disodium 1,5-naphthalenedisulfonate, or trisodium 1,3,6-naphthalenetrisulfonate.

Sulfuric acid ester salts and sulfonic acid salts commercially available or produced by known methods may be used.

Examples of commercially available products thereof include those available from a number of manufacturers described in "*Chemical Products,* 15911, 2011 (published from The Chemical Daily Co., Ltd., on Jan. 25, 2011) or "*Japan Cosmetic Ingredient Dictionary,* 2007" (published from Yakuji Nippo Limited, Ed., Japan Cosmetics Industry Association).

Among the anionic surfactants listed above, in consideration of a higher tendency that the effect in terms of improving the wettability of a substrate surface is exhibited, sodium lauryl sulfate, sodium linear dodecylbenzene sulfonate, sodium branched dodecylbenzene sulfonate, and sodium sulfosuccinic acid-di-2-ethylhexyl are preferable. From the same point of view, sodium linear dodecylbenzenesulfonate and sodium branched dodecylbenzenesulfonate are particularly preferable.

The treatment solution may include one anionic surfactant, or may include two or more anion surfactants in combination.

In the treatment solution according to the present disclosure, the ratio of the content (B) of the anionic surfactant with respect to the content (A) of the compound configured to aggregate at least one of the colorant or the resin particles in the ink composition described below, which is defined as the ratio B/A, is from 0.001 to 0.600 in terms of mass.

When the ratio B/A is 0.001 or more, an effect in terms of improving the substrate surface is obtained, and therefore, the effect in terms of suppression of decrease in density of a solid image and suppression of stripe-shaped unevenness is exerted. When the ratio B/A is 0.600 or less, the effect in terms of suppressing the graininess is exhibited. From the above viewpoints, the ratio B/A is more preferably from 0.010 to 0.250.

A content of the anionic surfactant with respect to the total mass of the treatment solution is preferably 0.01% by mass or more, more preferably from 0.01% by mass to 15% by mass, still more preferably from 0.1% by mass to 10% by mass, and particularly preferably from 0.5% by mass to 5% by mass.

—Aggregating Compound—

The treatment solution according to the present disclosure includes a compound configured to aggregate at least one of the colorant or the resin particles in the ink composition (aggregating compound).

The expression "aggregate at least one of the colorant or the resin particles" as used in the present disclosure means increasing the particle diameter of secondary particles that are formed of at least one of the colorant or the resin particles by destabilizing the dispersion state of at least one of the colorant or the resin particles in an ink composition. The change in the particle diameter can be observed by measuring the volume mean diameter based on dynamic light scattering method using, for example, a nanotrac particle size distribution measuring device UPA-EX150 (manufactured by Nikkiso Co., Ltd.).

Inclusion of a compound configured to aggregate at least one of the colorant or the resin particles in the treatment solution enables the resin particles and colorant included in the ink composition described below to be aggregated, and enables an image to be formed in high resolution.

The aggregating compound is preferably a compound configured to aggregate at least one of resin particles having an anionic dissociating group and an anionic colorant.

Examples of the compound configured to aggregate at least one of the colorant or the resin particles include an organic acid, an inorganic acid, a polyvalent metal salt, and a cationic organic compound. Among them, organic acid is preferable from the viewpoint of aggregation rate.

(Organic Acid)

Examples of the organic acid include an acidic compound having a carboxy group, a phosphonic acid group, a phosphinic acid group, a sulfate group, a sulfonic acid group, or a sulfinic acid group. Among the organic acids, from the viewpoint of aggregation rate, a compound having a carboxy group is preferable, and a compound having two carboxy groups in one molecule (a dicarboxylic acid compound) is more preferable.

The dicarboxylic acid compound is preferably tartaric acid, phthalic acid, 4-methylphthalic acid, DL-malic acid, malonic acid, glutaric acid, dimethyl malonic acid, or maleic acid, and is more preferably DL-malic acid, malonic acid, glutaric acid, dimethyl malonic acid, or maleic acid. The dicarboxylic acid compounds may be used singly, or in combination of two or more thereof.

(Inorganic Acid and Salt Thereof)

The inorganic acid preferably includes at least one selected from the group consisting of a phosphoric acid and a phosphoric acid compound. Inclusion of at least one selected from the group consisting of a phosphoric acid and a phosphoric acid compound further suppresses image graininess.

For example, phosphorous acid, hypophosphorous acid, pyrophosphoric acid, metaphosphoric acid, polyphosphoric acid, or a salt thereof may be used as the phosphoric acid compound.

In the treatment solution according to the present disclosure, the content of the organic acid with respect to the total sum of the content of the organic acid and the content of inorganic acid and salts thereof is not particularly limited, and is preferably from 60% by mass to 90% by mass. When the content is 60% by mass or more, the graininess of the image is further suppressed. When the content is 90% by mass or less, the scratch resistance of the image is further improved.

(Polyvalent Metal Salt)

Examples of the polyvalent metal salt include a salt of an alkaline earth metal of group 2 in the periodic table (for example, magnesium or calcium), a transition metal of group 3 in the periodic table (for example, lanthanum), a cation of a group 13 element in the periodic table (for example, aluminum), and a lanthanide (for example, neodymium).

The polyvalent metal salt is favorably a carboxylate (for example, formic acid, acetic acid, or benzoate), a nitrate, a chloride, or a thiocyanate. Among them, a calcium salt or magnesium salt of a carboxylic acid (for example, formic acid, acetic acid, or benzoic acid), a calcium salt or magnesium salt of nitric acid, calcium chloride, magnesium chloride, and a calcium salt or magnesium salt of thiocyanic acid are preferable.

(Cationic Organic Compound)

Examples of the cationic organic compound include a cationic polymer, examples of which include a poly(vinylpyridine) salt, polyalkyl aminoethyl acrylate, polyalkyl aminoethyl methacrylate, poly(vinylimidazole), polyethyleneimine, polybiguanide, polyguanide, polyallylamine and derivatives thereof.

The weight average molecular weight of the cationic polymer is preferably small from the viewpoint of the viscosity of the treatment solution. In the case of applying the treatment solution to a substrate by an inkjet method, the weight average molecular weight of the cationic polymer preferably falls within the range of 1,000 to 500,000, more preferably falls within the range of 1,500 to 200,000, and still more preferably falls within the range of 2,000 to 100,000. A weight average molecular weight of 1000 or more is advantageous in terms of aggregation rate, and 500,000 or less is advantageous in terms of ejection reliability. However, in the case of applying the treatment solution to a substrate by a method other than an inkjet method, it is not the same as above.

The weight average molecular weight can be measured by the aforementioned method.

In the present disclosure, the content of the aggregating compound with respect to the total mass of the treatment solution is, although not particularly limited, preferably 0.5% by mass to 30% by mass, more preferably 5% by mass to 28% by mass, and still more preferably 10% by mass to 26% by mass. A content of 0.5% by mass or more enables the graininess of the image to be suppressed. A content of 30% by mass or less enables the scratch resistance of the image to be improved.

—Silicone Resin Particles and Silica Particles—

The treatment solution according to the present disclosure preferably includes at least one selected from the group consisting of silicone resin particles and silica particles. Inclusion of at least one selected from the group consisting of silicone resin particles and silica particles in the treatment solution enables image defect caused by bubbles present in the treatment solution to be suppressed.

The treatment solution according to the present disclosure may foam depending on the content of the anionic surfactant. Use of at least one selected from the group consisting of silicone resin particles and silica particles as an antifoaming agent against foaming enables image defects to be effectively suppressed.

The silicone resin particles and the silica particles may be dispersed in water to take the form of emulsion (hereinafter, also referred to as a silicone emulsion).

The silicone emulsion preferably includes a silicone resin that has water dispersibility improved by being formed into an Oil/Water (O/W) state using an emulsifying agent (surfactant).

The silicone resin is not particularly limited, and may be appropriately selected from silicone resins that are used as effective components of known silicone antifoaming agents.

The scope of the silicone resin also includes a modified silicone resin, for example, a hydrophilic silicone resin.

Examples of the silicone resin particles include particles of organopolysiloxane such as dimethyl polysiloxane and particles of modified organopolysiloxane such as polyoxyalkylene-modified organopolysiloxane. The particles may be used singly, or in combination of two or more thereof.

For example, the silicone oils disclosed in Japanese Patent Application Publication No. H07-090128 and the silicone oil disclosed in Japanese Patent No. 3976113 may be used in particle form, as the silicone resin particles.

In a case that silica particles are included in the silicone emulsion, the silica particles are preferably silica particles having excellent anti-foaming property.

Examples of the silica particles having excellent antifoaming property include hydrophobic silica particles.

From the viewpoint of antifoaming property, the silicone emulsion having a viscosity of 100 $mm^2/s$ to 100,000 $mm^2/s$ at 25° C. is preferable as the silicone emulsion.

The following commercially available products may be used as the silicone emulsion. Examples of the commercially available products include KM-72, KM-72F, KM-90, KM-98 (manufactured by Shin-Etsu Chemical Co., Ltd.); SM-5571, SM-5572F, SM-5512 (manufactured by Dow Corning Toray Co., Ltd.); and TSA-739, TSA-7341, TSA-732, TSA-732A, TSA-772, TSA-730, TSA-770, TSA-775, YMA6509, TSA-737, TSA-737F (manufactured by Momentive Performance Materials Japan Limited Liability Co.).

Each of the TSA series manufactured by Momentive Performance Materials Japan Limited Liability Co. described above, includes silica particles.

The content of the silicone emulsion in the treatment solution is not particularly limited. From the viewpoint of further suppressing graininess of the image due to the addition of the silicone emulsion, the content of the silicone emulsion with respect to the total mass of the treatment solution is preferably 0.0001% by mass to 0.10% by mass, and more preferably 0.001% by mass to 0.10% by mass, in terms of the solid content.

Accordingly, from the viewpoint of further suppressing graininess of the image, the total content of the silicone resin particles and the silica particles in the treatment solution with respect to the total mass of the treatment solution is preferably 0.0001% by mass to 0.10% by mass, and more preferably 0.001% by mass to 0.10% by mass.

The ratio of the total content (C) of the silicone resin particles and silica particles with respect to the content (B) of the anionic surfactant in the treatment solution, which is defined as a ratio C/B, is preferably 0.0001 to 0.10 in terms of mass.

When the ratio C/B is 0.0001 or more, an image defect is effectively suppressed. When the ratio C/B is 0.10 or less, graininess is effectively suppressed.

From the above point of view, the ratio C/B is more preferably 0.01 to 0.10.

—Water—

The treatment solution according to the present disclosure includes water. The content of water is, although not particularly limited, preferably within the range of 10% by mass to 99% by mass, more preferably 50% by mass to 90% by mass, and still more preferably 60% by mass to 80% by mass, with respect to the total mass of the treatment solution.

—Organic Solvent—

It is preferable that the treatment solution according to the present disclosure includes at least one organic solvent.

An organic solvent of which 5 g or more dissolves in 100 g of water at 20° C. is preferable as the organic solvent (hereinafter, also referred to as a water-soluble organic solvent).

The same water-soluble organic solvents as the water-soluble organic solvents that may be included in the after-mentioned ink composition may be used as the water-soluble organic solvent. Among these, from the viewpoint of curling suppression, polyalkylene glycol or a derivative thereof is preferable, and at least one selected from the group consisting of diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

The content of the organic solvent in the treatment solution is not particularly limited, and from the viewpoint of curling suppression, is preferably 1% by mass to 30% by mass, and more preferably 5% by mass to 15% by mass, with respect to the total mass of the treatment solution.

—Water-Soluble Polymer—

It is preferable that the treatment solution according to the present disclosure includes at least one water-soluble polymer.

Due to the inclusion of at least one water-soluble polymer, aggregation rate can be suppressed to a certain degree and the ink droplets applied to a substrate can spread to a desired size. As a result, the density decrease in the solid image and stripe-shaped unevenness, which are caused by insufficient spreading of the ink, can be suppressed.

The expression "water-soluble" means the ability to dissolve in water at a predetermined concentration or more, and the ability to dissolve in an aqueous treatment solution (preferably, uniformly dissolve). Specifically, the solubility in water at 25° C. is preferably 5% by mass or more, and more preferably 10% by mass or more.

The water-soluble polymer is preferably a polymer compound including a structure unit having an ionic group (preferably, an anionic group). The use of a polymer compound of this kind enables the ink droplets applied to a substrate to effectively spread, thereby further suppressing the density decrease in the solid image and stripe-shaped unevenness.

Examples of the ionic group include a carboxy group, a sulfonic acid group, a phosphoric acid group, a boronic acid group, an amino group, an ammonium group, and a salt thereof. Among them, a carboxy group, a sulfonic acid group, a phosphoric acid group, or a salt thereof is preferable. A carboxy group, a sulfonic acid group, or a salt thereof is more preferable. A sulfonic acid group or a salt thereof is still more preferable.

The content of the structure unit having an ionic group (preferably, an anionic group) in the water-soluble polymer may be set to be, for example, 10% by mass to 100% by mass, preferably 10% by mass to 90% by mass, more preferably 10% by mass to 70% by mass, still more preferably 10% by mass to 50% by mass, and particularly preferably 20% by mass to 40% by mass, with respect to the total mass of the water-soluble polymer.

The weight average molecular weight of the water-soluble polymer is 10000 or more, and may be set to be, for example, 10000 to 100000. The weight average molecular weight of the water-soluble polymer is preferably 20000 to 80000 and more preferably 30000 to 80000.

The weight average molecular weight can be measured using the method described above.

The content of the water-soluble polymer in the treatment solution according to the present disclosure is not particularly limited, and is preferably 0.1% by mass to 10% by mass, and more preferably 0.1% by mass to 4% by mass with respect to the total mass of the treatment solution.

When the content is 0.1% by mass or more, the ink droplets can further spread. When the content is 10% by mass or less, an increase in the viscosity of the treatment solution can be further suppressed.

(Nitrogen-Containing Heterocyclic Compound)

The treatment solution according to the present disclosure may include a nitrogen-containing heterocyclic compound. The inclusion of a nitrogen-containing heterocyclic compound improves the scratch resistance of the image and the conveyance property of the substrate.

The structure of the nitrogen-containing heterocyclic compound is preferably a nitrogen-containing 5-membered ring structure or a nitrogen-containing 6-membered ring structure, and, among them, a nitrogen-containing 5-membered ring structure is more preferable.

Among nitrogen-containing 5-membered ring structures or nitrogen-containing 6-membered ring structures, a structure of a 5-membered or 6-membered heterocycle including at least one of a carbon atom, a nitrogen atom, an oxygen atom, a sulfur atom, and a selenium atom is preferable. The heterocycle may be condensed with an aromatic carbocycle or a heteroaromatic ring.

Examples of the heterocycle include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, and a pentaazaindene ring.

These rings may have a substituent. Examples of the substituent include a nitro group, a halogen atom (for example, a chlorine atom, or a bromine atom), a mercapto group, a cyano group, a substituted or unsubstituted alkyl group (for example, a methyl group, an ethyl group, a propyl group, a t-butyl group, or a cyanoethyl group), a substituted or unsubstituted aryl group (for example, a phenyl group, a 4-methanesulfonamido-phenyl group, a 4-methylphenyl group, a 3,4-dichlorophenyl group, or a naphthyl group), a substituted or unsubstituted alkenyl group (for example, an allyl group), a substituted or unsubstituted aralkyl group (for example, a benzyl group, a 4-methylbenzyl group, or a phenethyl group), a substituted or unsubstituted sulfonyl group (for example, a methanesulfonyl group, an ethanesulfonyl group, or a p-toluenesulfonyl group), a substituted or unsubstituted carbamoyl group (for example, an unsubstituted carbamoyl group, a methylcarbamoyl group, or a phenylcarbamoyl group), a substituted or unsubstituted sulfamoyl group (for example, an unsubstituted sulfamoyl group, a methyl sulfamoyl group, or a phenylsulfamoyl group), a substituted or unsubstituted carbonamide group (for example, an acetamide or a benzamide group), a substituted or unsubstituted sulfonamide group (for example, a methane sulfonamide group, a benzene sulfonamide group, or a p-toluene sulfonamide group), a substituted or unsubstituted acyloxy group (for example, an acetyloxy group and a benzoyloxy group), a substituted or unsubstituted sulfonyloxy group (for example, a methanesulfonyloxy group), a substituted or unsubstituted ureido group (for example, an unsubstituted ureido group, a methylureido group, an ethylureido group, or a phenyl ureido group), a substituted or unsubstituted acyl group (for example, an acetyl group or a benzoyl group), a substituted or unsubstituted oxycarbonyl group (for example, a methoxycarbonyl group or a phenoxycarbonyl group), a substituted or unsubstituted oxycarbonylamino group (for example, a methoxycarbonylamino group, a phenoxycarbonylamino group, or a 2-ethylhexyloxycarbonylamino group), and a hydroxyl group. Two or more substituents may be substituted on one ring.

Specific examples of a preferred nitrogen-containing heterocyclic compound include the following: imidazole, benzimidazole, benzoindazole, benzotriazole, tetrazole, benzoxazole, benzothiazole, pyridine, quinoline, pyrimidine, piperidine, piperazine, quinoxaline, and morpholine. These compounds may have a substituent group, for example, an alkyl group, a carboxy group, or a sulfo group as described above.

The nitrogen-containing 6-membered compound is preferably a compound having a triazine ring, a pyrimidine ring, a pyridine ring, a pyrroline ring, a piperidine ring, a pyridazine ring, or a pyrazine ring, and more preferably a compound having a triazine ring or a pyrimidine ring. The nitrogen-containing 6-membered compound may have a substituent group. Examples of the substituent includes a $C_1$-$C_6$ alkyl group, more preferably a $C_1$-$C_3$ alkyl group; a $C_1$-$C_6$ alkoxy group, more preferably a $C_1$-$C_3$ alkoxy group; a hydroxyl group; a carboxy group; a mercapto group; a $C_1$-$C_6$ alkoxyalkyl group, more preferably a $C_1$-$C_3$ alkoxyalkyl group; and a $C_1$-$C_6$ hydroxyalkyl group, more preferably a $C_1$-$C_3$ hydroxyalkyl group.

Specific examples of a preferred nitrogen-containing 6-membered compound include triazine, methyl triazine, dimethyl triazine, hydroxy ethyl triazine, pyrimidine, 4-methyl pyrimidine, pyridine, and pyrroline.

—Other Additives—

The treatment solution according to the present disclosure may include other additives in addition to the above components. Details and examples of other additives that may be used in the treatment solution are the same as those of additives that may be used in the ink composition described below.

The surface tension of the treatment solution is not particularly limited, and may be set to be, for example, 20 mN/m or more. From the viewpoint of coatability on a substrate, the surface tension is preferably 20 mN/m to 60 mN/m, and more preferably 25 mN/m to 45 mN/m.

Inclusion of, for example, a surfactant (the aforementioned anionic surfactant, and, if necessary, a surfactant different from the aforementioned anionic surfactant) enables the surface tension of the treatment solution to be controlled. The surface tension of the treatment solution can be measured under a condition of 25° C. by a plate method using an Automatic Surface Tensiometer CBVP-Z (manufactured by Kyowa Interface Science Co., Ltd.).

The treatment solution according to the present disclosure has a pH (under the condition of 25° C.±1° C.) of preferably 7.0 or less, more preferably 0.5 to 3.5, and still more preferably 0.5 to 2.0 from the viewpoint of the aggregation rate of the ink composition. The pH can be measured under the condition of 25° C. environment using a pH meter WM-50EG (manufactured by Toa DDK Corporation).

From the viewpoint of the aggregation rate of the ink composition, the viscosity of the treatment solution is preferably within the range of 1 mPa·s to 30 mPa·s, more preferably within the range of 1 mPa·s to 20 mPa·s, still more preferably within the range of 2 mPa·s to 15 mPa·s, and particularly preferably within the range of 2 mPa·s to 10 mPa·s. The viscosity can be measured under the condition of 25° C. using a VISCOMETER TV-22 (manufactured by Toki Sangyo Co., Ltd.).

<Ink Composition>

The ink composition according to the present disclosure includes resin particles, a colorant, and water.

The ink composition also includes, if necessary, a pigment dispersant (a polymer dispersant), an organic solvent, a neutralizing agent, and other components.

—Colorant—

The ink composition according to the present disclosure includes at least one colorant. The colorant is not particularly limited, and pigments and dyes are both usable.

The colorant is preferably an anionic colorant from the viewpoint of exhibiting excellent aggregation ability when brought into contact with the aforementioned aggregating compound.

The term "anionic colorant" means a colorant having an anionic group in the structure thereof, for example, a carboxy group, a sulfonic acid group, or a phosphoric acid. In a case that the colorant is coated with the dispersant described below, the anionic group is included in the structure of the dispersant.

(Pigment)

The pigment is not particularly limited. The pigment may be appropriately selected depending on the purpose, and may be, for example, either an organic pigment or an inorganic pigment. From the viewpoint of ink color ability, the pigment is preferably a pigment insoluble in water or hardly soluble in water.

Examples of the organic pigment include: a polycyclic pigment such as an azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment; a dye lake such as a basic dye type lake or an acidic dye type lake; a nitro pigment; a nitroso pigment; aniline black; and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black. Furthermore, any of pigments that are not listed in the color index but are capable of being dispersed in an aqueous phase can also be used. A pigment of which surface has been treated with, for example, a surfactant or a polymer dispersant, such as graft carbon, may be also used.

Among those pigments, an azo pigment, a phthalocyanine pigment, an anthraquinone pigment, a quinacridone pigment, and a carbon black pigment are preferable. An anionic azo pigment, an anionic phthalocyanine pigment, and an anionic quinacridone pigment are more preferable.

—Dispersant—

The ink composition according to the present disclosure is preferably in the form in which a pigment is dispersed using a dispersant. In particular, the form in which a pigment is dispersed using a polymer dispersant, that is, the form in which at least a part of a pigment is coated with a polymer dispersant, is preferable. The pigment of which at least a part is coated with a polymer dispersant is referred to as the "resin coated pigment", hereinafter.

The dispersant may be either a polymer dispersant or a surfactant-containing dispersant having a low molecular weight. The polymer dispersant may be either a polymer dispersant in which a polymer is not cross-linked (a non-crosslinked polymer dispersant) or a polymer dispersant in which a polymer is crosslinked by a cross-linking agent (a crosslinked polymer dispersant).

The non-crosslinked polymer dispersant may be either a water-soluble non-crosslinked polymer dispersant or a water-insoluble non-crosslinked polymer dispersant.

As the surfactant-containing dispersant having a low molecular weight, the surfactant-containing dispersant described in paragraphs [0016] to [0020] of JP-A No. 2010-188661 may be used.

As the water-soluble non-crosslinked polymer dispersant among the non-crosslinked polymer dispersants, a hydrophilic polymer compound may be used.

As the water-soluble non-crosslinked polymer dispersant, for example, the natural hydrophilic polymer compound described in paragraphs [0021] to [0022] of JP-A No. 2010-188661 may be used.

As the water-soluble non-crosslinked polymer dispersant, a synthesized hydrophilic polymer compound may also be used.

Examples of the synthesized hydrophilic polymer compound include: a vinyl-based polymer such as polyvinyl alcohol, polyvinylpyrrolidone, or polyvinylmethyl ether; an acrylic resin such as polyacrylamide, polyacrylic acid or an alkali metal salt thereof; a water-soluble styrene acryl resin; a water-soluble styrene maleic acid resin; a water-soluble vinyl naphthalene acryl resin; a water-soluble vinyl naphthalene maleic acid resin; polyvinylpyrrolidone; polyvinyl alcohol; an alkali metal salt of β-naphthalene sulfonic acid formalin condensate; and a polymer compound having, in a side chain thereof, a salt of a cationic functional group such as a quaternary ammonium group or an amino group to form a salt.

Among these, from the viewpoint of the dispersion stability and the aggregation ability of the pigment, a polymer compound having a carboxy group is preferable. A polymer compound having a carboxy group, for example, an acrylic resin such as a water-soluble styrene acryl resin, a water-soluble styrene maleic acid resin, a water-soluble vinyl naphthalene acryl resin, or a water-soluble vinyl naphthalene maleic acid resin are particularly preferable.

As the water-insoluble dispersant among the non-crosslinked polymer dispersants, a polymer having both a hydrophobic part and a hydrophilic part may be used. Examples thereof include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

The styrene-(meth)acrylic acid copolymer, the (meth)acrylic acid ester-(meth)acrylic acid copolymer, the polyethylene glycol (meth)acrylate-(meth)acrylic acid copolymer, and the styrene-maleic acid copolymer may be a bipolymer, a terpolymer, or a polymer formed from more than three monomers.

Among the above, as the non crosslinked polymer dispersant, a (meth)acrylic acid ester-(meth)acrylic acid copolymer is a preferable, and a benzyl (meth)acrylate-(meth)acrylic acid-methyl (meth)acrylate terpolymer is particularly preferable.

The term "(meth)acrylic acid" means acrylic acid or methacrylic acid, and the term "(meth)acrylate" means acrylate or methacrylate.

The copolymer may be a random copolymer, a block copolymer, or a graft copolymer.

The weight average molecular weight of the non-crosslinked polymer dispersant is preferably 3,000 to 200,000, more preferably 5,000 to 100,000, still more preferably 5,000 to 80,000, and particularly preferably 10,000 to 60,000.

The weight average molecular weight can be measured by the method described above.

The acid value of the non-crosslinked polymer dispersant is not particularly limited, and is preferably higher than that of the resin particles described below (preferably, self-dispersing resin particles) from the viewpoint of the aggregation ability.

The crosslinked polymer dispersant is formed by cross-linking a polymer (an uncrosslinked polymer) with a cross-linking agent.

The polymer is not particularly limited, and various polymers may be used. Among the polymers, for example, polyvinyls, polyurethanes, or polyesters, which can serve as water-soluble dispersant, are preferable, and polyvinyls are more preferable.

The polymer is preferably a copolymer which is obtained using a carboxy group-containing monomer as a copolymerization component. Examples of the carboxy group-containing monomer include (meth)acrylic acid, β-carboxyethyl acrylate, fumaric acid, itaconic acid, maleic acid, and crotonic acid. Among the above, (meth)acrylic acid and β-carboxyethyl acrylate are preferable from the viewpoint of the crosslinking ability and the dispersion stability of the polymer.

The polymer has a functional group crosslinkable by a cross-linking agent. The crosslinkable functional group is not particularly limited, and examples thereof include a carboxy group or a salt thereof, an isocyanate group, and an epoxy group. In view of improving dispersion ability, a carboxy group or a salt thereof is preferable.

The acid value of the polymer is preferably 90 mgKOH/g or more, and more preferably 95 mgKOH/g or more, from the viewpoint of the water solubility of the polymer.

Moreover, from the viewpoint of the dispersion ability and the dispersion stability of the pigment, the acid value of the polymer is preferably 100 mgKOH/g to 180 mgKOH/g, more preferably 100 mgKOH/g to 170 mgKOH/g, and still more preferably 100 mgKOH/g to 160 mgKOH/g.

The acid value can be measured by the method described in JIS standard (JISK0070, 1992).

The weight average molecular weight (Mw) of the polymer is preferably 50,000 to 120,000, more preferably 60,000 to 120,000, still more preferably 60,000 to 100,000, and particularly preferably 60,000 to 90,000.

The weight average molecular weight can be measured by the method described above.

The polymer preferably further includes at least one hydrophobic monomer as a copolymerization component. Examples of the hydrophobic monomer include a (meth)acrylate having a $C_1$ to $C_{20}$ alkyl group, a (meth)acrylate having an aromatic group, such as benzyl (meth)acrylate or phenoxyethyl (meth)acrylate, and styrene and derivatives thereof.

The copolymerization arrangement in the polymer is not particularly limited. The polymer may be a random polymer, a block polymer, or a graft polymer.

The method of synthesizing the polymer is not particularly limited, and a random polymerization of a vinyl monomer is preferable from the viewpoint of dispersion stability.

The cross-linking agent is not particularly limited as long as it is a compound having at least two sites which reacts with the polymer, and is preferably a compound having two or more epoxy groups (a bi-functional or higher-functional epoxy compound) from the viewpoint of having excellent reactivity with a carboxy group.

Examples of the cross-linking agent include ethylene glycol diglycidyl ether, polyethylene glycol diglycidyl ether, 1,6-hexane diol diglycidyl ether, diethylene glycol diglycidyl ether, polyethylene glycol diglycidyl ether, dipropylene glycol diglycidyl ether, polypropylene glycol diglycidyl ether, and trimethylol propane triglycidyl ether, and polyethylene glycol diglycidyl ether, diethylene glycol diglycidyl ether, and trimethylol propane triglycidyl ether are preferable.

Examples of a method of coating a pigment with a cross-linked polymer dispersant include a method in which a pigment is dispersed using a water-soluble polymer or a water-insoluble polymer, followed by crosslinking the polymer by a cross-linking agent to prepare a pigment dispersion.

In the ink composition according to the present disclosure, the mass ratio of the pigment to the dispersant (pigment:dispersant) is preferably within the range of 1:0.06 to 1:3, more preferably within the range of 1:0.125 to 1:2, and still more preferably within the range of 1:0.125 to 1:1.5.

The mean particle diameter of the pigment (in the case of the resin coated pigment, the mean particle diameter of the resin coated pigment, the same applies hereinafter) is preferably 10 nm to 200 nm, more preferably 10 nm to 150 nm, and still more preferably 10 nm to 100 nm. When the mean particle diameter is 200 nm or less, color reproducibility is favorable and the deposition characteristics during deposition by an inkjet method are favorable. When the mean particle diameter is 10 nm or more, light resistance is improved. The particle size distribution of the pigment is not particularly limited, and may be either a broad particle size distribution or a monodisperse particle size distribution. Two or more kinds of pigment having a monodisperse particle size distribution may be used in combination.

The mean particle diameter and the particle diameter distribution of a pigment can be determined calculating the volume mean particle diameter by dynamic light scattering method using a nanotrac particle size distribution measuring device UPA-EX150 (manufactured by Nikkiso Co., Ltd.).

In the present disclosure, the content of the pigment in the ink composition is preferably 1% by mass to 25% by mass, more preferably 2% by mass to 20% by mass, and particularly preferably 2% by mass to 10% by mass, with respect to the total mass of the ink composition, from the viewpoint of image density.

The ink composition may include only one pigment, or two or more pigments in combination.

(Dye)

Known dyes may be used as the dye without any limitation. The dyes described in, for example, JP-A No. 2001-115066, JP-A No. 2001-335714, and JP-A No. 2002-249677 may be preferably used in the present invention.

Furthermore, when a dye is used, the dye may be retained on a water-insoluble carrier. The carrier retaining a dye (also referred to as water-insoluble colored particles) may be treated using a dispersant, and used in the form of an aqueous dispersion. The carrier is not particularly limited as long as the carrier is insoluble or hardly soluble in water. Inorganic materials, organic materials, and composite materials thereof may be used as the carrier. Specifically, the carriers described in, for example, JP-A No. 2001-181549 and JP-A No. 2007-169418 may be also favorably used in the present invention.

—Resin Particles—

The ink composition according to the present disclosure includes at least kind of resin particles.

The resin particles are different from the polymer dispersant (the polymer dispersant that coats at least a part of the pigment) in that the resin particles are present separately from the pigment.

The resin particles aggregate when brought into contact with the aggregating compound included in the treatment solution, as a result of which the deposition interference of droplets of the ink composition including the resin particles is suppressed and image graininess is suppressed.

The resin particles are preferably resin particles having an anionic dissociating group from the viewpoint of having excellent aggregation ability when brought into contact with the aggregating compound. Details of the particles having an anionic dissociating group will be described below.

The resin particles are preferably water-insoluble or hardly water-soluble resin particles.

The expression "water-insoluble or hardly water-soluble" means that, when the resin particles are dried for 2 hours at 105° C., and then dissolved in 100 g of water at 25° C., the dissolution amount of the resin particles is 15 g or less. In view of improving the continuous ejection performance and the ejection stability of an ink, the amount of dissolution is preferably 10 g or less, more preferably 5 g or less, and still more preferably 1 g or less. The amount of dissolution means a dissolved amount when the salt-forming groups of water-insoluble or hardly water-soluble resin particles are 100% neutralized with sodium hydroxide or acetic acid.

Examples of the resin particles include particles of a resin having an anionic group such as: acrylic resin, an epoxy-based resin, a polyurethane-based resin, a polyether-based resin, a polyamide-based resin, an unsaturated polyester-based resin, a phenolic resin, a silicone-based resin, or a fluorine-based resin, each of which is thermoplastic, thermosetting, or modified; a polyvinyl-based resin such as polyvinyl chloride, polyvinyl acetate, polyvinyl alcohol, or polyvinyl butyral; a polyester-based resin such as an alkyd resin or a phthalic acid resin; an amino-based material such as a melamine resin, a melamine formaldehyde resin, an amino-alkyd co-condensate resin, or a urea resin; or a copolymer or a mixture thereof. Among these resins, for example, the anionic acrylic resin may be obtained by polymerizing an acrylic monomer having an anionic group (hereinafter referred to as an "anionic group-containing acrylic monomer") in a solvent, or polymerizing an anionic group-containing acrylic monomer and other monomer capable of copolymerizing therewith in a solvent. Examples of the anionic group-containing acrylic monomer include an acrylic monomer having at least one selected from the group consisting of a carboxy group, a sulfonic acid group, and a phosphonic group. Among these, an acrylic monomer having a carboxy group, for example, acrylic acid, methacrylic acid, crotonic acid, ethacrylic acid, propylacrylic acid, isopropylacrylic acid, itaconic acid, or fumaric acid, is preferable, and acrylic acid or methacrylic acid is particularly preferable.

The resin particles according to the present disclosure are preferably particles of self-dispersing resin (hereinafter referred to as "self-dispersing resin particles"), from the viewpoint of ejection stability and the liquid stability (particularly, dispersion stability) of the system including a colorant, particularly dispersion stability thereof. The term "self-dispersing resin" means a water insoluble polymer which can get into a dispersion state in an aqueous medium due to the functional groups contained in the polymer (in particular, acidic groups or salts thereof) when the polymer is dispersed by a reverse phase emulsification in the absence of a surfactant.

The term "dispersion state" as used herein includes both of an emulsion state (emulsion) in which a water-insoluble polymer is dispersed in liquid state in an aqueous medium and a dispersion state (suspension) in which a water-insoluble polymer is dispersed in solid state in an aqueous medium.

The term "aqueous medium" as used herein means a medium containing water. The aqueous medium may include a hydrophilic organic solvent, if necessary. The aqueous medium preferably includes water and a 0.2% by mass or less of hydrophilic organic solvent with respect to water, and more preferably consists of water only.

The self-dispersing resin is preferably capable of providing a dispersion state in which the water-insoluble polymer is dispersed in a solid state from the viewpoint of aggregation rate and fixing ability when the self-dispersing polymer is included in the ink composition.

Examples of the method of obtaining an emulsion or dispersion state of the self-dispersing resin, that is, the method of preparing an aqueous dispersion of the self-dispersing resin particles, includes a phase inversion emulsification method.

Examples of the phase inversion emulsification method includes a method in which a self-dispersing resin is dissolved or dispersed in a solvent (for example, a water-soluble organic solvent), the resultant is added to water without any surfactant, the salt forming groups (for example, acidic groups) in the self-dispersing resin are neutralized, and the resultant is stirred and mixed, followed by removing the solvent to obtain an aqueous dispersion in an emulsion or dispersion state.

Furthermore, the stable emulsion or dispersion state of the self-dispersing resin means that, the emulsion or dispersion state is stable at least for 1 week at 25° C. (a state in which precipitates are not visually confirmed), even after a solution in which 30 g of the water-insoluble polymer is dissolved in 70 g of an organic solvent (for example, methyl ethyl ketone), a neutralizing agent capable of 100% neutralizing salt-forming groups of the water-insoluble polymer (in the case that the salt-forming groups are anionic, the neutralizing agent is sodium hydroxide, and in the case that the salt-forming groups are cationic, the neutralizing agent is acetic acid), and 200 g of water are mixed and stirred for 30 minutes at 25° C. (apparatus: stirrer added with stirring blades, revolution number: 200 rpm), and the organic solvent is removed from the mixture.

Furthermore, the stability of the emulsion or dispersion state of the self-dispersing resin can be also evaluated by an accelerated precipitation test using centrifugation. The stability based on the accelerated precipitation test using centrifugation can be evaluated by, for example, adjusting the aqueous dispersion of resin particles obtained by the above method to have a solid concentration of 25% by mass, and then centrifuging the aqueous dispersion for 1 hour at 12000 rpm, and measuring the solid concentration in the supernatant after the centrifugation.

When the ratio of the solid concentration after centrifugation with respect to the solid concentration before centrifugation is large (the ratio is close to 1), resin particles are not precipitated by the centrifugation, that is, the aqueous dispersion of resin particles is more stable. In the present disclosure, the ratio of the solid concentration after centrifugation to the solid concentration before centrifugation is preferably 0.8 or more, more preferably 0.9 or more, and particularly preferably 0.95 or more.

In the self-dispersing resin, the content of water-soluble component exhibiting water solubility in the dispersed state is preferably 10% by mass or less, more preferably 8% by mass or less, and still more preferably 6% by mass or less. Regulating the content of the water-soluble component to be 10% by mass or less enables the swelling of the resin particles and the cohesion among the resin particles to be effectively suppressed to maintain the dispersion state more stable. Furthermore, the viscosity increase of the ink composition can be suppressed as a result of which ejection stability becomes more favorable, for example, when the ink composition is applied to an inkjet method.

The water-soluble component means a compound that is included in the self-dispersing resin, and that dissolves in water when the self-dispersing resin is dispersed to a dispersion state. The water-soluble component is a water-soluble compound which is produced as a side-product or incorporated during the preparation of the self-dispersing resin.

The main chain skeleton of the water-insoluble polymer is not particularly limited, and for example, a vinyl polymer, and a condensation polymer, (such as an epoxy resin, polyester, polyurethane, polyamide, cellulose, polyether, polyurea, polyimide, or polycarbonate) may be used. Among them, a vinyl polymer is particularly preferable.

Preferred examples of the vinyl polymer and the monomer constituting the vinyl polymer include those described in JP-A No. 2001-181549 and JP-A No. 2002-88294. Furthermore, it is also possible to use a vinyl polymer having a dissociating group at a terminal of a polymer chain, the dissociating group being introduced by radical polymerization of a vinyl monomer using a chain transfer agent, polymerization initiator, or iniferter having a dissociating group or a substituent group which can be converted to a dissociating group, or by ion polymerization using an initiator or a terminating agent either of which has a dissociating group or a substituent group which can be converted to a dissociating group.

Furthermore, preferred examples of the condensation polymer and the monomer constituting the condensation polymer include those described in JP-A No. 2001-247787.

From the viewpoint of dispersion stability, the resin particles according to the present disclosure preferably include a water-insoluble polymer including a hydrophilic structure unit and a structure unit derived from a monomer containing an aromatic group or a monomer containing a cyclic aliphatic group.

The hydrophilic structure unit is not particularly limited, as long as it is derived from a monomer containing a hydrophilic group. The hydrophilic structure unit may be derived from one type of monomer containing a hydrophilic group or two or more types of monomer containing a hydrophilic group. The hydrophilic group is not particularly limited, and may be either a dissociating group or a nonionic hydrophilic group.

From the viewpoint of the stability of an emulsion or dispersion state, the hydrophilic group is preferably a dissociating group, and more preferably an anionic dissociating group.

Therefore, the resin particles according to the present disclosure are preferably resin particles having an anionic dissociating group.

Examples of the dissociating group include a carboxy group, a phosphoric acid group, and a sulfonic acid group. From the viewpoint of fixing ability in the case of formation of an ink composition, a carboxy group is preferable.

From the viewpoint of dispersion stability and aggregation ability, the monomer containing a hydrophilic group is preferably a monomer having a dissociating group, and more preferably a monomer having a dissociating group including a dissociating group and an ethylenically unsaturated bond.

Examples of the monomer containing a dissociating group include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxymethyl succinic acid.

Examples of the unsaturated sulfonic acid monomer include, styrene sulfonic acid, 2-acrylamide-2-methylpropane sulfonic acid, 3-sulfopropyl (meth)acrylate, and bis-(3-sulfopropyl)itaconate.

Examples of the unsaturated phosphoric acid monomer include vinyl phosphonic acid, vinyl phosphate, bis(methacryloxyethyl) phosphate, diphenyl 2-acryloxyethyl phosphate, diphenyl 2-methacryloxyethyl phosphate, and dibutyl 2-acryloxyethyl phosphate.

As the monomer containing a dissociating group, an unsaturated carboxylic acid monomer is preferable, and acrylic acid and methacrylic acid are more preferable, from the viewpoint of dispersion stability and ejection stability.

The resin particles preferably include a polymer having a carboxy group from the viewpoint of dispersion stability and aggregation rate when brought into contact with a treatment solution, and more preferably include a polymer having a carboxy group and the acid value of 25 mgKOH/g to 100 mgKOH/g. Furthermore, an acid value is more preferably 25 mgKOH/g to 80 mgKOH/g, and particularly preferably 30 mgKOH/g to 65 mgKOH, from the viewpoint of self-dispersing ability and aggregation rate when brought into contact with a treatment solution.

When the acid value is 25 mgKOH/g or more, dispersion stability is favorable. When the acid value is 100 mgKOH/g or less, aggregation ability is improved.

The acid value can be measured by the above-described method.

Any compound containing an aromatic group and a polymerizable group may be used as the monomer containing an aromatic group without any limitation. The aromatic group may be either a group derived from an aromatic hydrocarbon or a group derived from an aromatic heterocycle. In the present invention, from the view point of stabilizing the particle shape in an aqueous medium, an aromatic group derived from an aromatic hydrocarbon is preferable.

The polymerizable group may be either a polycondensable group or an addition polymerizable group. In the invention, from the viewpoint of the particle shape stability in an aqueous medium, an addition polymerizable group is preferable, and a group containing an ethylenically unsaturated bond is more preferable.

The monomer containing an aromatic group is preferably a monomer having an ethylenically unsaturated bond and an aromatic group derived from an aromatic hydrocarbon. It is allowed to use only one monomer containing an aromatic group or two or more monomers containing an aromatic group in combination.

Examples of the monomer containing an aromatic group include phenoxyethyl (meth)acrylate, benzyl (meth)acrylate, phenyl (meth)acrylate, and a styrene-based monomer. Among the above, from the viewpoint of the balance between the hydrophilicity and the hydrophobicity of a polymer chain, and ink deposition ability, a (meth)acrylate monomer containing an aromatic group is preferable, phenoxyethyl (meth)acrylate, benzyl (meth)acrylate, and phenyl (meth)acrylate are more preferable, and phenoxyethyl (meth)acrylate and benzyl (meth)acrylate are more preferable.

The term "(meth)acrylate" means an acrylate or a methacrylate.

The monomer containing a cyclic aliphatic group is preferably a monomer having an ethylenically unsaturated bond and a cyclic aliphatic group derived from a cyclic aliphatic hydrocarbon, and is more preferably a (meth)acrylate monomer having a cyclic aliphatic group (hereinafter, it may be also referred to as an "alicyclic (meth)acrylate").

The alicyclic (meth)acrylate has a structure having a structure unit derived from (meth)acrylic acid and a structure unit derived from an alcohol, in which at least one unsubstituted or substituted alicyclic hydrocarbon group (cyclic hydrocarbon group) is included in the structure unit derived from alcohol. The alicyclic hydrocarbon group may be a structure unit derived from alcohol or may be bonded to a structure unit derived from alcohol via a linking group.

The alicyclic hydrocarbon group is not particularly limited as long as a cyclic non-aromatic hydrocarbon group is contained, examples of which include a monocyclic hydrocarbon group, a bicyclic hydrocarbon group, and a polycyclic hydrocarbon group that is formed of three or more cyclic structures. Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and bicyclo[4.3.0]nonyl group.

The alicyclic hydrocarbon group may further have a substituent group. Examples of the substituent group include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group. The alicyclic hydrocarbon group may further form a condensed ring. The alicyclic hydrocarbon group according to the present disclosure preferably contains 5 to 20 carbon atoms, from the viewpoint of viscosity and solubility.

Specific examples of the alicyclic (meth)acrylate are described below, but the invention is not limited to them.

Examples of a monocyclic (meth)acrylate include a cycloalkyl (meth)acrylate having a $C_3$ to $C_{10}$ cycloalyl group such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of a bicyclic (meth)acrylate include isobornyl (meth)acrylate and norbornyl (meth)acrylate.

Examples of a tricyclic (meth)acrylate include adamantyl (meth)acrylate, dicyclopentanyl (meth)acrylate, and dicyclopentenyloxyethyl (meth)acrylate.

These alicyclic (meth)acrylates may be used singly or in mixture of two or more thereof.

From the viewpoint of dispersion stability of resin particles, fixing ability, and blocking resistance, it is preferable that the alicyclic (meth)acrylate is at least one selected from the group consisting of bicyclic (meth)acrylates and polycyclic (meth)acrylates that are each formed of three or more cyclic structures and it is more preferable that the alicyclic (meth)acrylate is at least one selected from the group consisting of isobornyl (meth)acrylate, adamantyl (meth) acrylate, and dicyclopentanyl (meth)acrylate.

As the resin used for forming resin particles, an acrylic resin including a structure unit derived from a (meth) acrylate monomer is preferable, an acrylic resin including, in a ratio of 10% by mass to 95% by mass, a structure unit derived from a (meth)acrylate monomer containing an aromatic group or an alicyclic (meth)acrylate is preferable, and an acrylic resin including a structure unit derived from a (meth)acrylate monomer containing an aromatic group or an alicyclic (meth)acrylate, is preferable. A content of the (meth)acrylate monomer containing an aromatic group or an alicyclic (meth)acrylate of 10% by mass to 95% by mass enables the stability of the emulsion state or dispersion state to be improved and the increase in ink viscosity to be suppressed.

From the viewpoint of the stability of the dispersion state, the stabilization of particle shape in an aqueous medium due to hydrophobic interaction among aromatic rings or among aliphatic rings, and the decrease in the amount of water-soluble components due to suitable hydrophobization of particles, the content of the (meth)acrylate monomer containing an aromatic group or an alicyclic (meth)acrylate is preferably 15% by mass to 90% by mass, more preferably 15% by mass to 80% by mass, and particularly preferably 25% by mass to 70% by mass.

It is possible that the resin used for forming the resin particles include, for example, a structure unit derived from a monomer containing an aromatic group or a monomer containing a cyclic aliphatic group, and a structure unit derived from a monomer containing a dissociating group. If necessary, other structure units may be further included.

Monomers forming other structure units are not particularly limited, as long as they are copolymerizable with the monomer containing an aromatic group and the monomer containing a dissociating group, and are preferably monomers containing an alkyl group, from the viewpoint of easily controlling the flexibility or the glass transition temperature (Tg) of polymer skeleton.

Examples of a monomer containing an alkyl group include: an alkyl (meth)acrylate such as methyl (meth) acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; a dialkylaminoalkyl (meth)acrylate such as dimethylaminoethyl (meth)acrylate; N-hydroxyalkyl (meth)acrylamide such as N-hydroxymethyl (meth)acrylamide, N-hydroxyethyl (meth)acrylamide, or N-hydroxybutyl (meth)acrylamide; and an N-alkoxyalkyl (meth)acrylamide such as N-methoxymethyl (meth)acrylamide, N-ethoxymethyl (meth)acrylamide, N-(n-butoxy)methyl (meth)acrylamide, N-isobutoxymethyl (meth)acrylamide, N-methoxyethyl (meth)acrylamide, N-ethoxyethyl (meth)acrylamide, N-(n-butoxy)ethyl (meth)acrylamide, or N-isobutoxyethyl (meth)acrylamide.

The molecular weight range of the water-insoluble polymer constituting the resin particles is, in terms of weight average molecular weight, preferably 3,000 to 200,000, more preferably 5,000 to 150,000, and still preferably 10,000 to 100,000. A weight average molecular weight of 3,000 or more enables the amount of water-soluble components to be effectively reduced. Furthermore, the weight average molecular weight of 200,000 or less enables dispersion stability to be enhanced.

The weight average molecular weight can be measured by the above-described method.

From the viewpoint of the balance between the hydrophilicity and the hydrophobicity of a polymer, the water-insoluble polymer constituting the resin particles preferably includes a structure unit derived from a (meth)acrylate monomer containing an aromatic group (preferably, a structure unit derived from phenoxyethyl (meth)acrylate and/or a structure unit derived from benzyl (meth)acrylate) or a structure unit derived from a monomer containing a cyclic aliphatic group (preferably, a structure unit derived from an alicyclic (meth)acrylate), in a content amount of 15% by mass to 80% by mass with respect to the total mass of the resin particles, in terms of copolymerization ratio.

From the viewpoint of the balance between the hydrophilicity and the hydrophobicity of a polymer, the water-insoluble polymer preferably includes: a structure unit derived from a (meth)acrylate monomer containing an aromatic group or an alicyclic (meth)acrylate monomer, in a content amount of 15% by mass to 80% by mass in terms of copolymerization ratio; a structure unit derived from a carboxy group-containing monomer; and a structure unit derived from a monomer containing an alkyl group (preferably, a structure unit derived from an alkyl ester of (meth)acrylic acid). The water-insoluble polymer more preferably includes: a structure unit derived from phenoxyethyl (meth)acrylate and/or a structure unit derived from benzyl (meth)acrylate in a content amount of 15% by mass to 80% by mass in terms of copolymerization ratio; a structure unit derived from a carboxy group-containing monomer; and a structure unit derived from a monomer containing an alkyl group (preferably, a structure unit derived from a $C_1$ to $C_4$ alkyl ester of (meth)acrylic acid).

The water-insoluble polymer preferably has an acid value of 25 mgKOH/g to 100 mgKOH/g and has a weight average molecular weight of 3,000 to 200,000, and more preferably has an acid value of 25 mgKOH/g to 95 mgKOH/g and has a weight average molecular weight of 5,000 to 150,000. The acid value and the weight average molecular weight can be measured by the above-described method.

Hereinafter, exemplary compounds B-01 to B-23 are listed as specific examples of the water-insoluble polymer constituting the resin particles, but the invention is not limited thereto. Meanwhile, the numbers described in the parentheses represent the mass ratios of copolymerizable components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5) B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5) B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

B-20: methyl methacrylate/isobornyl methacrylate/methacrylic acid copolymer (20/72/8)

B-21: methyl methacrylate/isobornyl methacrylate/methacrylic acid copolymer (40/52/8)

B-22: methyl methacrylate/isobornyl methacrylate/dicyclopentanyl methacrylate/methacrylic acid copolymer (20/62/10/8)

B-23: methyl methacrylate/dicyclopentanyl methacrylate/methacrylic acid copolymer (20/72/8).

The method employed for producing the water-insoluble polymer included in the resin particles is not particularly limited, and examples thereof include: a method of carrying out emulsion polymerization in the presence of a polymerizable surfactant to form a covalent bond between the surfactant and a water-insoluble polymer; and a method of performing a known polymerization method such as solution polymerization or bulk polymerization to copolymerize a monomer mixture containing the above-described monomer containing a hydrophilic group, and a monomer containing an aromatic group or a monomer containing an alicyclic group. Among the polymerization methods, from the viewpoint of aggregation rate and deposition stability when the resin particles are used as an ink composition, solution polymerization is preferable, and solution polymerization using an organic solvent is more preferable.

From the viewpoint of aggregation rate, it is preferable that the resin particles include a polymer synthesized in an organic solvent, the polymer having an anionic group (such as a carboxy group) and preferably having an acid value of 20 mgKOH/g to 100 mgKOH/g, and that the resin particles are prepared as a polymer dispersion containing water as a continuous phase, and that some or all of the anionic groups (such as carboxy groups) of the polymer are neutralized.

Accordingly, production of the resin particles is preferably carried out through a process of synthesizing a polymer in an organic solvent and a dispersion process of neutralizing at least some of anionic groups (such as carboxy groups) of the polymer to obtain an aqueous dispersion.

The dispersion process preferably includes the following process (1) and process (2).

Process (1): a process of stirring a mixture containing a polymer (such as a water-insoluble polymer), an organic solvent, a neutralizing agent, and an aqueous medium.

Process (2): a process of removing the organic solvent from the mixture.

The process (1) is preferably a treatment of initially dissolving the polymer (the water-insoluble polymer) in an organic solvent and gradually adding a neutralizing agent and an aqueous medium, followed by mixing and stirring the resultant to obtain a dispersion. Inclusion of a neutralizing agent and an aqueous medium in a solution of the water-insoluble polymer in an organic solvent enables resin particles having a particle diameter with improved storage stability to be obtained without applying a strong shear force.

The method of stirring a mixture is not particularly limited, and a mixing and stirring device that is generally used can be used, and, if necessary, a disperser such as an ultrasonic disperser or a high pressure homogenizer can be used.

In the process (2), the organic solvent is distilled off from a dispersion product obtained by the process (1) by a common method such as reduced-pressure distillation to cause phase inversion to aqueous phase, thereby obtaining an aqueous dispersion of resin particles. The organic solvent has been substantially removed from the obtained aqueous dispersion, and the amount of the organic solvent is preferably 0.2% by mass or less and, more preferably 0.1% by mass or less.

Preferred examples of the organic solvent include an alcohol-based solvent, a ketone-based solvent, and an ether-based solvent. As the organic solvent, the organic solvents exemplified in paragraph [0059] of JP-A No. 2010-188661 may be used.

As the neutralizing agent, the neutralizing agents exemplified in paragraphs [0060] to [0061] of JP-A No. 2010-188661 may be used.

The mean particle diameter of the resin particles (self-dispersing resin particles, in particular) according to the present disclosure is preferably within the range of 10 nm to 400 nm, more preferably within the range of 10 nm to 200 nm, still more preferably within the range of 10 nm to 100 nm, and particularly preferably within the range of 10 nm to 50 nm, in terms of volume-based mean particle diameter. When the volume-based mean particle diameter is 10 nm or more, productivity is improved. When the volume-based mean particle diameter is 400 nm or less, storage stability is improved. Furthermore, the particle size distribution of the resin particles is not particularly limited, and either resin particles having a broad particle size distribution or resin particles having a monodisperse particle size distribution can be used. It is also possible to use a mixture of two or more kinds of resin particles.

The mean particle diameter and the particle diameter distribution of the resin particles can be determined by calculating the volume-based mean particle diameter by dynamic light scattering method using nanotrac particle size distribution measuring device UPA-EX150 (manufactured by Nikkiso Co., Ltd.).

The ink composition according to the present disclosure may include only one kind of resin particles or two or more kinds of resin particles (preferably, self-dispersing resin particles).

The content (total content) of the resin particles (preferably, self-dispersing resin particles) in the ink composition is, from the viewpoint of image gloss or the like, preferably 1% by mass to 30% by mass, and more preferably 3% by mass to 15% by mass, with respect to the total amount of the ink composition.

—Water—

The ink composition according to the present disclosure includes water. The content of water is not particularly limited, and is preferably within the range of 10% by mass to 99% by mass, more preferably 30% by mass to 80% by mass, and still more preferably 50% by mass to 80% by mass with respect to the total mass of the ink composition.

—Organic Solvent—

It is more preferable that the ink composition according to the present disclosure further includes at least one organic solvent (preferably, a water-soluble organic solvent). Inclusion of an organic solvent, in particular, a water-soluble organic solvent enables drying to be prevented and permeation to be improved.

In the case of using a water-soluble organic solvent as a drying-prevention agent, nozzle clogging which may be caused by ink drying at ink ejection part during forming an image with ejecting an ink composition by an inkjet method can be effectively prevented.

For the purpose of drying prevention, a water-soluble organic solvent having a vapor pressure lower than that of water is preferable. Specific examples of the water-soluble organic solvent favorable for drying prevention include: polyhydric alcohols such as ethylene glycol, propylene glycol, diethylene glycol, polyethylene glycol, thio diglycol, dithio diglycol, 2-methyl-1,3-propane diol, 1,2,6-hexane triol, acetylene glycol derivatives, glycerin, and trimethylol propane; lower alkyl ethers of polyhydric alcohols such as ethylene glycol monomethyl (or monoethyl) ether, diethylene glycol monomethyl (or monoethyl) ether, triethylene glycol monoethyl (or monobutyl) ether, and tripropylene glycol monomethyl (or monoethyl) ether; heterocycles such as 2-pyrrolidone, N-methyl-2-pyrrolidone, 1,3-dimethyl-2-imidazolidinone, and N-ethylmorpholine; sulfur-containing compounds such as sulforane, dimethyl sulfoxide, and 3-sulfolene; polyfunctional compounds such as diacetone alcohol and diethanolamine; and urea derivatives.

Among the water-soluble organic solvents, a polyvalent alcohol such as glycerin or diethylene glycol is preferable. Furthermore, the water-soluble organic solvent may be used either singly or in combination of two or more thereof. The water-soluble organic solvent is preferably included in the ink composition in 10% by mass to 50% by mass.

Furthermore, for the purpose of improving permeation, a water-soluble organic solvent is favorably used from the viewpoint of more improved permeation of the ink composition to a substrate. Specific examples of the water-soluble organic solvent favorable for permeation improvement include alcohols such as ethanol, isopropanol, butanol, di(t-ri)ethylene glycol monobutyl ether, tripropylene glycol monomethyl (or ethyl) ether, or 1,2-hexane diol, sodium lauryl sulfate, sodium oleate, and nonionic surfactants. These water-soluble organic solvents produce a favorable effect, when they are included in 5% by mass to 30% by mass in the ink composition. Furthermore, the water-soluble organic solvent is preferably used within a content amount range which does not result in smearing of printed characters or images or print-through.

Furthermore, water-soluble organic solvents can be also used for the purpose of viscosity control in addition to the above-described purpose. Specific examples of the water-soluble organic solvent which can be used for viscosity control include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexane diol, pentane diol, glycerin, hexanetriol, and thio diglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether; amines such as ethanolamine, diethanolamine, triethanolamine, N-methyl diethanolamine, N-ethyl diethanolamine, morpholine, N-ethylmorpholine, ethylenediamine, diethylenetriamine, triethylenetetramine, polyethyleneimine, and tetramethylpropylenediamine; and other polar solvents such as formamide, N,N-dimethylformamide, N,N-dimethylacetamide, dimethyl sulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, and acetone.

The water-soluble organic solvent may be used either singly or in combination of two or more thereof.

—Surfactant—

The ink composition according to the present disclosure may include at least one surfactant.

Examples of the surfactant include a nonionic surfactant, a cationic surfactant, an anionic surfactant, and a betaine surfactant. From the viewpoint of aggregation rate, an anionic surfactant or a nonionic surfactant is preferable.

From the viewpoint of favorable deposition by an inkjet method, the surfactant is preferably included in an amount such that the surface tension of the ink composition can be controlled to be 25 mN/m to 40 mN/m. The content of surfactant is preferably an amount that enables the surface tension to be controlled to be 27 mN/m to 37 mN/m.

Surfactants can also be used as an anti-foaming agent. As surfactants, a fluorine-based compound, a silicone-based compound, and a chelating agent such as ethylenediamine tetraacetic acid (EDTA) can also be used.

—Other Additives—

The ink composition according to the present disclosure may further include other additives in addition to the above-described components. Examples of other additives include known additives such as a discoloration inhibitor, an emulsion stabilizer, a permeation promoter, a UV absorbing agent, a corrosion inhibitor, an anti-mildew agent, a pH controlling agent, an anti-foaming agent, a viscosity modifying agent, a dispersion stabilizer, an anti-corrosion agent, and a chelating agent. Those additives can be added directly after preparing the ink composition, or may be added during preparation of the ink composition.

As a pH controlling agent, a neutralizing agent (such as an organic base or an inorganic alkali) can be used. From the viewpoint of improving the storage stability of the ink composition, the pH controlling agent is preferably included such that the ink composition has a pH of 6 to 10, and is more preferably included such that the ink composition has a pH of 7 to 10.

The viscosity of the ink composition according to the present disclosure is, from the viewpoint of ejection stability in the case of carrying out ejection by an inkjet method and aggregation rate in the case of using the treatment solution described below, preferably within the range of 1 mPa·s to 30 mPa·s, more preferably within the range of 1 mPa·s to 20 mPa·s, still more preferably within the range of 2 mPa·s to 15 mPa·s, and particularly preferably within the range of 2 mPa·s to 10 mPa·s.

The viscosity of the ink composition is measured under the condition of 25° C. using VISCOMETER TV-22 (manufactured by Toki Sangyo Co., Ltd.).

The ink composition according to the present disclosure is preferably an ink composition that includes resin particles and a pigment coated with a polymer dispersant having a carboxy group that has a solid content ratio of 7% by mass to 10% by mass, and that has a content ratio of solid components other than the pigment of 0.8 to 1.6 with respect to the pigment. The ink composition according to the present disclosure is more preferably an ink composition that includes self-dispersing resin particles and a pigment coated with an acrylic polymer that has a solid content ratio of 7% by mass to 9% by mass, and that has a content ratio of solid components other than the pigment of 1.0 to 1.4 with respect to the pigment.

Hereinabove, explanations are given for the ink set according to the present disclosure. However, the configuration of the ink set according to the present disclosure is not particularly limited as long as the ink set includes at least one of the ink composition and the treatment solution in combination.

In the ink set according to the present disclosure, the ratio of the total content (D) of the resin particles and the colorant in the ink composition with respect to the content (A) of the aggregating compound in the total mass of the treatment solution, which is defined as a ratio D/A, is not particularly limited. The ratio (D/A) is preferably 0.1 to 50, more preferably 0.15 to 10, and still more preferably 0.25 to 5 in terms of mass.

When the ratio (D/A) is 50 or less, the graininess of an image can be suppressed. When it is 0.1 or more, the scratch resistance of an image is improved.

Furthermore, examples of preferred embodiments of the ink set according to the present disclosure include: a configuration (three-color configuration) which includes a cyan ink formed of an ink composition, a magenta ink formed of an ink composition, an yellow ink formed of an ink composition, and the treatment solution in combination; and a configuration (four-color configuration) which includes a black ink formed of an ink composition, a cyan ink formed of an ink composition, a magenta ink formed of an in composition, an yellow ink formed of an ink composition, and the treatment solution in combination.

Meanwhile, the ink set according to the present disclosure may have, if necessary, a single-color configuration or a two-color configuration which respectively includes one kind of ink composition or two kinds of ink compositions and the treatment solution.

The ink set according to the present disclosure may include, in addition to the above-described ink compositions, other ink compositions such as at least one selected from a light cyan ink, a light magenta ink, or a light yellow ink, if necessary. The other ink compositions are not particularly limited, and any known ink composition can be used.

The ink set according to the present disclosure may include two or more kinds of treatment solutions, if necessary.

When the ink set according to the present disclosure includes two or more kinds of ink compositions, at least one of the ink compositions is an ink composition that includes resin particles and a pigment. When the ink set according to the present disclosure includes two or more kinds of treatment solutions, at least one of the treatment solutions is a treatment solution that includes an aggregating compound and an anionic surfactant.

The ink set according to the present disclosure is favorably used for the image forming method according to the present disclosure described below.

<Image Forming Method>

The image forming method according to the present disclosure includes a pre-treatment process for providing the treatment solution of the ink set according to the present disclosure on at least one surface of a substrate, the substrate exhibiting a contact angle of 70° or more 3 seconds after depositing a water drop to the surface, and an image forming process for ejecting the ink composition of the ink set according to the present disclosure by an inkjet method to the substrate surface on which the treatment solution has been provided, whereby an image is formed.

[Pre-Treatment Process]

The pre-treatment process is a process for providing the treatment solution of the ink set according to the present disclosure on at least one surface of a substrate, the substrate exhibiting a contact angle of 70° or more 3 seconds after depositing a water drop to the surface.

Provision of the treatment solution can be performed using a known method, such as a coating method, an inkjet method, or an immersion method. The coating method can be performed by a known coating method using, for example, a bar coater, an extrusion die coater, an air doctor coater, a blade coater, a rod coater, a knife coater, a squeeze coater, or a reverse roll coater. Details of the inkjet method will be explained as described above.

The pre-treatment process is carried out before the image forming process in which the ink composition is used.

Specifically, before applying (depositing) the ink composition to a substrate, the treatment solution configured to aggregate the components of the ink composition (for example, resin particles and colorants) is provided thereon in advance, and the ink composition is deposited so as to contact with the treatment solution provided on the substrate, and an image is formed. These processes can speed up the inkjet recording, and provide an image having high density and high resolution even at high speed recording.

In the present disclosure, it is preferable that the treatment solution on the substrate is heated and dried during a period after the provision of the treatment solution on a substrate but before the deposition of the ink composition. Due to this, ink colorability becomes favorable in terms of, for example, bleeding-resistance, and a visible image having a favorable color density and a favorable color can be formed.

Heating by drying can be performed by a known heating apparatus such as a heater, an air blowing means utilizing air blowing generated by such as a dryer, or by a means in which a heating apparatus and an air blowing means are combined.

Examples of heating methods include a method of applying heat by a heater or the like from a side of the substrate opposite to the side onto which the treatment solution has been provided, a method of exposing a surface of the substrate onto which the treatment solution has been provided to warm air or hot air, and a heating method using an infrared heater or the like. Heating may be performed by combining two or more of these methods.

[Image Forming Process]

Image forming process is a process of forming an image by ejecting the ink composition of the ink set according to the present disclosure to a substrate surface applied with the treatment solution using an inkjet method.

The inkjet method is not particularly limited, and may be any well-known system, examples of which include a charge control system in which an ink is ejected using electrostatic attraction force, a drop on-demand system in which a vibration pressure of a piezo element is used (pressure pulse system), an acoustic inkjet system in which electric signals are converted into acoustic beams and applied to an ink so as to eject the ink by a radiation pressure, and a thermal inkjet system in which an ink is heated to form bubbles and the resultant pressure is utilized (BUBBLEJET®). As the inkjet method, in particular, an inkjet method described in JP-A No. S54-59936 can effectively be used, in which an ink exposed to heat energy undergoes a rapid volume change, and ejected through nozzles due to the state change.

Examples of the inkjet method include a system in which a number of ink droplets having low concentration, so-called "photo-ink", are ejected in small volume, a system of improving image quality using plural inks having substantially the same color and having different density, and a system using a colorless transparent ink.

An inkjet head used for the inkjet method is not particularly restricted, and may be an on-demand system or continuous system. Specific examples of an ejection system include an electric-mechanical conversion system (for example, a single cavity type, a double cavity type, a bender type, a piston type, a share mode type, and a shared wall type), an electric-thermal conversion system (for example, a thermal inkjet type, and a BUBBLEJET® type), an electrostatic attraction system (for example, an electric field control type, and a slit jet type), and an electrical discharge system (for example, a spark jet type). Any of these systems may be used.

An ink nozzle or the like which is used for recording by an inkjet method is not particularly limited, and can be appropriately selected depending on the purpose.

Examples of the inkjet head include a shuttle system in which a short serial head is used and moved in scanning manner in the width direction of a substrate to carry out a recording, and a line head system in which a line head on which recording elements arranged parallel to the entire length of one side of a substrate is used. In the line system, image recording can be performed over the whole surface of a substrate by moving the substrate in scanning manner in a direction orthogonal with the direction along which the recording elements are arranged, and a conveyance system such as a carriage which moves the short head in a scanning manner is unnecessary. Since a complicated scan-control of the substrate and the movement of the carriage is unnecessary and only the substrate is moved, the recording speed can be increased compared to the shuttle system.

The image forming method according to the present disclosure can be used for any of these systems. In a case that the image forming method is used in the line system, in which dummy jetting is not generally performed, the effects of improving the ejection performance and enhancing the scratch resistance are great.

The image forming process is preferably started within 10 seconds, and more preferably within 0.1 second to 10 seconds, after the pre-treatment process. Starting of the image forming process within such a period can speed up the formation of an image.

Furthermore, in the image forming method according to the present disclosure, using the aforementioned ink set enables the deposition interference to be suppressed and an image with high definition to be formed even when an image is formed at high speed.

The expression "is started within 10 seconds after the pre-treatment process" means that the time period from the completion of provision and drying of the treatment solution to the deposition of the first ink droplet to a substrate is 10 seconds or less.

Furthermore, with a view to forming a high-definition image, the amount of each ink droplet applied (deposited) in the image forming process is preferably from 1.5 to 3.0 pL (pico liter) and more preferably from 1.5 pL to 2.5 pL.

The amount of the ink droplet can be controlled by appropriately selecting the ejection conditions for the inkjet method in accordance with the ink composition to be deposited.

[Heating and Fixing Step]

In the present disclosure, it is preferable to further perform a heating and fixing process for heating and fixing an image formed by application of the ink composition and the treatment solution. Performing the heating and fixing process causes fixation of the image on the substrate, and the abrasion resistance of the image can be further improved.

The heating is preferably performed at a temperature higher than or equal to the minimum film-forming temperature (MFT) of the resin particles in the image. When heated to a temperature higher than or equal to the MFT, the particles form a film coating, whereby the abrasion resistance of the image is improved.

When heating is performed under pressurization, the pressure during pressurization is preferably within the range of 0.1 MPa to 3.0 MPa, more preferably within the range of 0.1 MPa to 1.0 MPa, and still more preferably within the range of 0.1 MPa to 0.5 MPa, from the viewpoint of surface smoothening.

The heating method is not particularly limited, and favorable examples thereof include methods of drying in a non-contact manner, such as a method of heating by a heat generator such as a nichrome wire heater; a method of supplying warm air or hot air; and a method of heating using a halogen lamp, or an infrared lamp.

The method of heating and pressurizing is not particularly limited, but suitable examples thereof include methods of heating and fixing in a contact manner, such as a method of pressing a hot plate against the image-formed surface of a substrate, or a method of passing the substrate between a pair of rollers using a heat-pressing apparatus equipped with a pair of heat-pressing rollers, a pair of heat-pressing belts, or a heat-pressing belt disposed on the image-formed surface of the substrate and a retaining roller disposed on the opposite side thereof.

In the case of performing heat-pressing, the nip time is preferably 1 millisecond to 10 seconds, more preferably 2 millisecond to 1 seconds, and still more preferably 4 millisecond to 100 milliseconds. The nip width is preferably 0.1 mm to 100 mm, more preferably 0.5 mm to 50 mm, and still more preferably 1 mm to 10 mm.

The heat-pressing roller may be a metal roller formed of metal or a roller having a core metal surrounded by a coating layer formed of an elastic body and an optional surface layer (or a release layer). The core of the latter may be composed of, for example, a barrel made of iron, aluminum or stainless steel (SUS), and the surface of the cores is preferably at least partially covered with a coating layer. The coating layer is particularly preferably formed of a silicone resin or a fluororesin having a releasing property. It is preferable that a heat generating element is installed inside the core of one of the heat-pressing rollers. When the substrate passes between the rollers, the heating treatment and the pressing treatment are simultaneously performed. Alternatively, the substrate may be heated by being sandwiched between two heating rollers. The heat generating element is preferably, for example, a halogen lamp, a ceramic heater, or nichrome-wire heater.

The belt substrate forming the heat-pressing belt which is used in a heat-pressing device is preferably seamless electroformed nickel, and the thickness of the substrate is preferably 10 μm to 100 μm. Other than nickel, aluminum, iron, polyethylene or the like can be used as a material of the belt substrate. In the case that a silicone resin or a fluororesin is introduced, the thickness of the layer formed using those resins is preferably 1 μm to 50 μm, and more preferably 10 μm to 30 μm.

To provide the pressure (nip pressure), an elastic member such as a spring having tension can be selected and installed on both ends of a roller such as a heat-pressing roller such that a desired nip pressure can be obtained considering the nip space.

The conveyancing speed of the substrate in the case of using a heat-pressing roller or a heat-pressing belt is preferably 200 mm/sec to 700 mm/sec, more preferably 300 mm/sec to 650 mm/sec, and still more preferably 400 mm/sec to 600 mm/sec.

[Post-Treatment Process]

In the image forming method according to the present disclosure, an embodiment is preferable in which, after the above-described pre-treatment process and the image forming process, a post-treatment process for applying a coating liquid for post-treatment of the image-formed surface to a substrate surface having an image formed thereon ("image-formed surface) is provided. The post-treatment process may alternatively be a process for forming a protective layer on the image-formed surface.

(Coating Solution)

As the coating solution applied in the post-treatment process, an aqueous coating solution or a UV curable coating solution which is cured by ultraviolet ray (UV) may be used. Among them, from the viewpoint of achieving excellent glossiness after the post-treatment process, it is preferable to use an aqueous coating solution including resin particles, an alkali component, and water.

—Resin Particles—

The resin particles included in the aqueous coating solution are preferably particles of a resin capable of forming a protective layer on the substrate. Preferred examples of the resin include an acrylic resin, a styrene-acrylic resin, an urethane resin, an acrylic-silicone resin, and a fluororesin. Among them, an acrylic resin obtained by copolymerization of (meth)acrylic acid, (meth)acrylic acid ester, and a monomer component copolymerizable with (meth)acrylic acid or (meth)acrylic acid ester is preferable. The resin particles may include a wax component.

The glass transition temperature (Tg) of the resin in resin particles is preferably −30° C. or higher, and more preferably within the range of −20° C. to 100° C. When the glass transition temperature (Tg) of the resin particles is −30° C. or higher, the tackiness similar to an adhesive agent is suppressed after moisture evaporates.

The minimum film-forming temperature (MFT) of the resin in resin particles is preferably 50° C. or lower, and more preferably 35° C. or lower. When the minimum film-forming temperature of the resin in the resin particles is 50° C. or lower, film-forming can be performed within a short time.

The mean particle diameter of the resin particles is preferably 50 nm to 300 nm. The mean particle diameter and particle size distribution of the resin particles can be determined by measuring the volume-based mean diameter by dynamic light scattering method using NANOTRAC UPA-EX150 (manufactured by Nikkiso Co., Ltd.).

The content of the resin particles in the aqueous coating solution is, with respect to the total mass of the aqueous coating solution, preferably 1% by mass to 50% by mass, and more preferably 20% by mass to 40% by mass, in terms of solid matter.

—Alkali Component—

Preferred examples of the alkali component included in the aqueous coating solution include sodium hydroxide, potassium hydroxide, sodium carbonate, sodium hydrogen carbonate, potassium carbonate, ammonia, and organic amine compounds such as monoethanolamine, diethanolamine, monoisopropanolamine, diisopropanolamine, triisopropanolamine, 2-amino-2-methyl-1-propanol, dimethylaminoethanol, N-methylethanolamine, N-ethylethanolamine, and ethylenediamine.

Inclusion of an alkali component in the aqueous coating solution can prevent the aqueous coating solution from being thickened by an interaction between the resin particles included in the aqueous coating solution and the aggregating compounds in the treatment solution, as a result of which the leveling property can be maintained. Therefore, it is possible to form a smooth protective layer, whereby glossiness of a surface having an image formed thereon (image-formed surface) is improved.

The content of the alkali component in the aqueous coating solution in terms of solid matter is preferably 1% by mass to 20% by mass, and more preferably 1% by mass to 10% by mass, with respect to the total mass of the aqueous coating solution. When the content is 1% by mass or more, glossiness quality can be significantly improved. When the content is 20% by mass or less, abrasion resistance of the coating film can be favorably maintained.

—Water—

The content of water in the aqueous coating solution is, although not particularly limited, preferably within the range of 10% by mass to 99% by mass, more preferably 50% by mass to 90% by mass, and still more preferably 60% by mass to 80% by mass, with respect to the total mass of the aqueous coating solution.

—Other Additives—

The aqueous coating solution may further include other additives in addition to the above-described components. Examples of other additives include known additives, such as a surfactant, a discoloration inhibitor, an emulsion stabilizer, a permeation promoter, a UV absorbing agent, a corrosion inhibitor, an anti-mildew agent, a pH controlling agent, an anti-foaming agent, a viscosity modifying agent, a dispersion stabilizer, an anti-corrosion agent, and a chelating agent.

The aqueous coating solution may be a solution prepared by mixing the resin particles, the alkali component, and water, or may be a commercially available product. The aqueous coating solution including the resin particles, the alkali component, and water can be obtained by adding the alkali component to a commercially available aqueous coating solution.

Examples of the commercially available aqueous coating solution which can be used include HYDLITH2012R-1, HYDLITH2200, HYDLITH2025, HYDLITH2024E, HYDLITH2022, HYDLITH2019 (all manufactured by DIC corporation), DIC Safe C-1151 and DIC Safe C-1160 (all manufactured by DIC Corporation), Aqua pack varnish F22, F58, F68, S-CL (all manufactured by T&K TOKA), and Litho unity glossy varnish (manufactured by TOYO INK CO., LTD.).

The surface tension of the aqueous coating solution is not particularly limited, and may be set to be, for example, 20 mN/m or more. The surface tension of the aqueous coating solution is more preferably within the range of 20 mN/m to 60 mN/m, and still more preferably within the range of 25 mN/m to 45 mN/m, from the viewpoint of coatability to a substrate.

The surface tension of the aqueous coating solution can be controlled, for example, by adding a surfactant. The surface tension of the aqueous coating solution is a value which is determined by measurement under the condition of 25° C. by a plate method using Automatic Surface Tensiometer CBVP-Z (manufactured by Kyowa Interface Science Co., Ltd.).

The pH (at 25° C.±1° C.) of the aqueous coating solution is preferably within the range of 6.0 to 12.0, and more preferably within the range of 7.0 to 10.0. The pH is a value determined by measurement using a ph meter WM-50EG (manufactured by Toa DDK Corporation) under the condition of 25° C.

From the viewpoint of the coating property, the viscosity of the aqueous coating solution is preferably within the range of 50 mPa·s to 500 mPa·s, and more preferably within the range of 100 mPa·s to 300 mPa·s. The viscosity is a value determined by measurement using a VISCOMETER TV-22 (manufactured by Toki Sangyo Co., Ltd.) under the condition of 25° C.

The aqueous coating solution can be applied onto a substrate using a known method, such as a coating method, an inkjet method, or an immersion method. Examples of the coating method include a known coating method using, for example, a bar coater, an extrusion die coater, an air doctor coater, a blade coater, a rod coater, a knife coater, a squeeze coater, a reverse roll coater, or a bar coater. Furthermore, lamination and press coating may be further performed after application of the aqueous coating solution.

The dry amount of the aqueous coating solution applied to the substrate is preferably within the range of 0.5 g/m$^2$ to 10 g/m$^2$, and more preferably within the range of 2 g/m$^2$ to 8 g/m$^2$. When the application amount is 0.5 g/m$^2$ or more, the image quality (image density, chroma, gloss level, and fixing characteristics) is further improved. When the application amount is 10 g/m$^2$ or less, the drying characteristics of the protective film can be favorably maintained, and thus the effect of in terms of improving the image quality is significantly exerted.

If necessary, the image forming method according to the present disclosure may include a fixing process in which the substrate applied with the aqueous coating solution is heated to 100° C. to 150° C. by a heating means, and the ink composition applied to the substrate is thermally fixed to the substrate. Inclusion of the fixing process enables the glossiness and the fixing characteristics of an image to be improved.

A heated roller, drum heater, or the like, is preferably used as a heating means. In the case that thermal fixing is performed by a heating means, the image surface may be brought into contact with a smooth surface of a roll heater or a drum heater. The heating temperature is preferably equal to or higher than the softening temperature of the resin particles included in the aqueous coating solution. From the viewpoint of image quality, safety, and economic value, a fixing roller heated to 100° C. to 150° C. is preferable.

(Substrate)

In the image forming method according to the present disclosure, as described above, the treatment solution is applied to a substrate that would exhibit a contact angle of 70° or more when 3 seconds has passed after a water drop is applied to the surface thereof at normal temperature and normal humidity, and an image is formed on a surface applied with the treatment solution.

The substrate is selected from substrates that would exhibit a contact angle of 70° or more when 3 seconds has passed after a water drop is applied to the surface thereof. Specific examples include a paper substrate such as coated paper, synthetic paper, and a polymer substrate such as a polyethylene terephthalate (PET) film. Among those substrates, a paper substrate, which exerts excellent effect with respect to suppression of the density decrease in a solid image, stripe-shaped unevenness, and graininess, is preferable. A paper substrate having a coating layer (coated paper) is more preferable.

The contact angle between the substrate and water can be measured based on the method described in JIS R3257 using a contact angle meter Drop master DM700 (manufactured by Kyowa Interface Science Co.).

As the paper substrate, so-called coated paper is preferable. Coated paper is a paper in which a coating layer including inorganic pigments or the like is provided on a surface of high quality paper, neutral paper or the like, which mainly consists of cellulose and serves as a support and which is generally not surface-treated. Although coated paper tends to exhibit uneven gloss of an image part, when phosphoric acid or a phosphoric acid compound is included in the treatment solution, the uneven gloss of the image part can be effectively suppressed. Specifically, art paper, coated paper, light-weight coated paper, or a slightly coated paper is preferable.

The inorganic pigment included in the coating layer is not particularly limited, and is preferably at least one selected from silica, kaolin, clay, calcined clay, zinc oxide, tin oxide, magnesium sulfate, aluminum oxide, aluminum hydroxide, pseudo-boehmite, calcium carbonate, satin white, aluminum silicate, smectite, zeolite, magnesium silicate, magnesium carbonate, magnesium oxide, or diatomaceous earth, and is more preferably calcium carbonate, silica, and kaolin.

A commercially available substrate can be used as a substrate, and examples thereof include MagnoStarGloss (manufactured by Sappi), Carolina C2S (manufactured by International Company), CartaIntegra (manufactured by Metsaboard), and VJFP series (manufactured by YUPO).

In the present disclosure, the amount of the treatment solution applied and the amount of the ink composition applied are preferably controlled in accordance with the necessity. For example, the application amount of the treatment solution may be varied depending on the substrate in order to, for example, control properties such as viscoelasticity of an aggregate obtained by mixing the treatment solution and the ink composition.

EXAMPLES

Hereinafter, the present invention will be more specifically described with reference to examples as below. However, the scope of the invention is not limited to the following specific examples. In addition, the "parts" is on a mass basis, unless otherwise specified.

The weight average molecular weight was calculated using gel permeation chromatography (GPC). In the GPC, unless otherwise specified, HLC-8020GPC (manufactured by Tosoh Corporation) was used with three columns of TSKgel Super Multipore HZ-H (manufactured by Tosoh Corporation, 4.6 mm internal diameter (ID)×15 cm), and THF (tetrahydrofuran) as an eluent. The measurement was performed under conditions in which the sample concentration was 0.45% by mass, the flow rate was 0.35 ml/min, the sample injection amount was 10 and the measurement temperature was 40° C., and a refractive index (RI) detector was used in the measurement. A calibration curve was prepared from eight samples of Standard Samples TSK standard polystyrene manufactured by Tosoh Corporation, specifically, F-40, F-20, F-4, F-1, A-5000, A-2500, A-1000, and n-propylbenzene.

<Synthesis of Polymer Dispersant P-1>

The polymer dispersant P-1 was synthesized as described below in accordance with the following scheme.

was dispersed by a bead mill using a zirconia beads having diameter of 0.1 mmφ for 2 hours to 6 hours.

The obtained dispersion was subjected to reduced pressure at 55° C. to remove methyl ethyl ketone therefrom, and to further remove a portion of water, followed by subjecting the resultant to a centrifugal treatment at 8000 rpm for 30 minutes using a 50 mL centrifugal tube by a high-speed centrifugal cooler 7550 (manufactured by Kubota Corporation). After the centrifugal treatment, a supernatant liquid other than the precipitate was collected. Then, a pigment concentration thereof was determined from an absorbance spectrum, and a dispersion (cyan dispersion liquid C) of resin-coated pigment particles (pigments coated with a polymer dispersant) having a pigment concentration of 10.2% by mass was obtained. The mean particle diameter of the resin-coated pigment particles of the obtained cyan dispersion liquid C was found to be 105 nm.

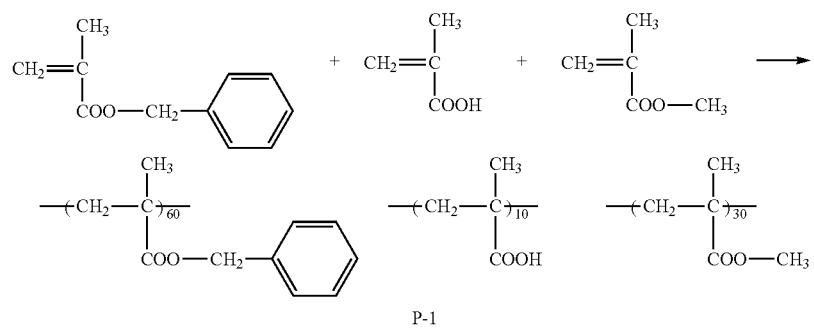

P-1

88 g of methyl ethyl ketone was added to a 1000 mL three-neck flask equipped with a stirrer and a cooling tube, and heated to 72° C. in a nitrogen atmosphere. A solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was dropped into the flask over 3 hours. After the completion of dropping, the mixture was allowed to further react for an hour, and a solution in which 0.42 g of dimethyl 2,2'-azobisisobutyrate was dissolved in 2 g of methyl ethyl ketone was added thereto, followed by raising the temperature of the mixture to 78° C. and heating the mixture for 4 hours. The obtained reaction solution was twice subjected to reprecipitation in a large excess amount of hexane, the precipitated resin was dried, and 96 g of polymer dispersant P-1 was obtained. The number assigned to each constituent unit of polymer dispersant P-1 represents a mass ratio.

The composition of the obtained resin was determined by proton nuclear magnetic resonance ($^1$H-NMR) and the weight average molecular weight (Mw) calculated using the GPC was found to be 44,600. Furthermore, the acid value as determined by the method described in the JIS standard (JISK0070: 1992) was 65.2 mgKOH/g.

<Preparation of Pigment Dispersion Liquid>

(Preparation of Cyan Dispersion Liquid)

10 parts of Pigment Blue 15:3 (Phthalocyanine Blue A220, manufactured by Dainichiseika Color & Chemicals Mfg. Co., Ltd.) which is a cyan pigment, 5 parts of a polymer dispersant P-1, 42 parts of methyl ethyl ketone, 5.5 parts of an 1×10$^3$ mol/L NaOH aqueous solution, and 87.2 parts of ion-exchange water were mixed, and the mixture Meanwhile, the mean particle diameter was determined by dynamic light scattering method using a nanotrac particle size distribution measuring device UPA-EX150 (manufactured by Nikkiso Co., Ltd.).

(Preparation of Magenta Dispersion Liquid)

A dispersion (magenta dispersion liquid M) of resin-coated pigment particles (pigment coated with a polymer dispersant) was prepared in the same manner as in the preparation of the cyan dispersion liquid, except that Pigment Red 122, which is a magenta pigment, was used instead of Pigment Blue 15:3 (Phthalocyanine Blue A220, manufactured by Dainichiseika Color & Chemicals Mfg. Co., Ltd.) used in the preparation of the cyan dispersion liquid. The mean particle diameter of the resin-coated pigment particles of the obtained magenta dispersion liquid M was found to be 85 nm. The mean particle diameter was measured by the above-described method.

(Preparation of Yellow Dispersion Liquid)

A dispersion (yellow dispersion liquid Y) of resin-coated pigment particles (pigment coated with a polymer dispersant) was prepared in the same manner as in the preparation of the cyan dispersion liquid, except that Pigment Yellow 74, which is an yellow pigment, was used instead of Pigment Blue 15:3 (Phthalocyanine Blue A220, manufactured by Dainichiseika Color & Chemicals Mfg. Co., Ltd.) used in the preparation of the cyan dispersion liquid. The mean particle diameter of the resin-coated pigment particles of the obtained yellow dispersion liquid Y was found to be 82 nm. The mean particle diameter was measured by the above-described method.

(Preparation of Black Dispersion Liquid)

A dispersion (black dispersion liquid K) of resin-coated pigment particles (pigment coated with a polymer dispersant) was prepared in the same manner as in the preparation of the cyan dispersion liquid, except that carbon black (NIPEX 160-IQ manufactured by DEGUSSA), which is a black pigment, was used instead of Pigment Blue 15:3 (Phthalocyanine Blue A220, manufactured by Dainichiseika Color & Chemicals Mfg. Co., Ltd.) used in the preparation of the cyan dispersion liquid. The mean particle diameter of the resin-coated pigment particles of the obtained black dispersion liquid K was found to be 130 nm. The mean particle diameter was measured by the above-described method.

<Preparation of Resin Particles>

Into a 2 L three-necked flask equipped with a stirrer, a thermometer, a reflux condenser, and a nitrogen gas introduction tube, 360.0 g of methyl ethyl ketone was added, and was heated to 75° C. While maintaining the temperature inside the reaction vessel at 75° C., a mixed solution containing 180.0 g of phenoxyethyl acrylate, 162.0 g of methyl methacrylate, 18.0 g of acrylic acid, 72 g of methyl ethyl ketone and 1.44 g of V-601 (polymerization initiator, manufactured by Wako Pure Chemical Industries Ltd.) was dropped thereto at a constant rate such that the dropping was completed in 2 hours. After the completion of the dropping, a solution consisting of 0.72 g of V-601 and 36.0 g of methyl ethyl ketone was added, and stirred at 75° C. for 2 hours. After the stirring, a solution consisting of 0.72 g of V-601 and 36.0 g of isopropanol was added thereto, and stirred at 75° C. for 2 hours, followed by heating the mixture to 85° C. and further stirring for 2 hours. As a result, a polymer solution of a copolymer was obtained. The obtained copolymer has a weight average molecular weight (Mw) of 64,000 and an acid value of 38.9 mgKOH/g. The acid value and the weight average molecular weight were respectively measured by the above-described methods.

668.3 of the polymer solution was weighed, and 388.3 g of isopropanol and 145.7 ml of 1 mol/L NaOH aqueous solution were added thereto, and the temperature inside the reaction vessel was elevated to 80° C. Next, 720.1 g of distilled water was dropped at a rate of 20 ml/min, thereby forming an aqueous dispersion. Thereafter, under atmospheric pressure, the temperature inside the reaction vessel was maintained at 80° C. for 2 hours, at 85° C. for 2 hours, and then at 90° C. for 2 hours, followed by reducing the pressure inside the reaction vessel to distill away isopropanol, methyl ethyl ketone, and distilled water in a total amount of 913.7 g, whereby an aqueous dispersion (emulsion) of the resin particles (B-01) having a solid content concentration of 28.0% by mass was obtained. Meanwhile, the number assigned to each structure unit of the compound example (B-01) illustrated below represents a mass ratio. The same shall apply to each structural formula hereinafter.

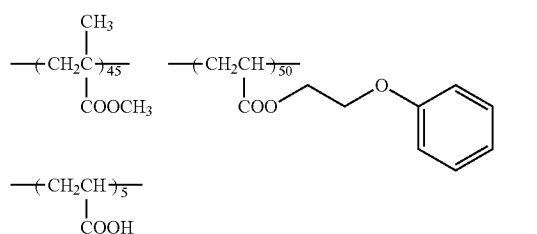

(B-01)

<Preparation of Ink 1>

Components were mixed to obtain ink compositions indicated in the following Table 1 using each of the obtained pigment dispersion liquids (cyan dispersion liquid C, magenta dispersion liquid M, yellow dispersion liquid Y, and black dispersion liquid K) and the resin particles B-01, whereby ink compositions (magenta ink composition M1, black ink composition K1, cyan ink composition C1, and yellow ink composition Y1) were prepared.

Each of the prepared ink compositions was filtered through a 5 μm filter formed of polyvinylidene fluoride (PVDF) (Millex SV, diameter of 25 mm, manufactured by Milipore Corporation) using a disposable syringe made of plastic, to obtain ink 1 (magenta ink M1, black ink K1, cyan ink C1, or yellow ink Y1).

TABLE 1

| | | Ink 1 | | | |
|---|---|---|---|---|---|
| Ink Composition | | M1 | K1 | C1 | Y1 |
| Ink Composition (% by mass) | Magenta Pigment (Pigment • Red 122) | 4 | — | — | — |
| | Black Pigment (Carbon Black) | — | 4 | — | — |
| | Cyan Pigment (Pigment • Blue 15:3) | — | — | 4 | — |
| | Yellow Pigment (Pigment • Yellow 74) | — | — | — | 4 |
| | Pigment Dispersant (Polymer Dispersant P-1) | 2 | 2 | 2 | 2 |
| | SANNIX GP-250 | 10 | 10 | 10 | 10 |
| | Tripropylene Glycol Monomethyl Ether | 5 | 5 | 5 | 5 |
| | Olfin E1010 | 1 | 1 | 1 | 1 |
| | Resin Particles (B-01) | 8 | 8 | 8 | 8 |
| | Water | 70 | 70 | 70 | 70 |

Details of the components listed in Table 1 are described below.

SANNIX GP-250: organic solvent manufactured by Sanyo Chemical Industries, Ltd.

OLFIN E1010: nonionic surfactant manufactured by Nissin Chemical Industry Co., Ltd.

<Preparation of Treatment Solution 1 to Treatment Solution 19>

The treatment solution 1 to the treatment solution 19 were prepared by mixing the components listed in the following Table 2 and Table 3.

The structure of the water-soluble polymer in Table 2 and Table 3 are illustrated below. The number assigned to each constituent unit of the water-soluble polymer illustrated below represents a mass ratio (% by mass).

Water Soluble Polymer

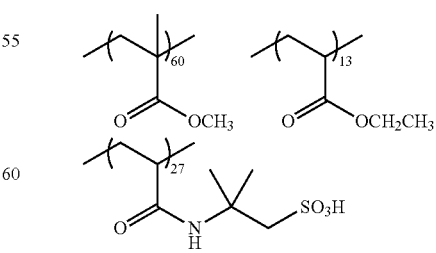

The water-soluble polymer was synthesized as follows.

30.0 g of isopropyl alcohol was put into a 200 mL three-necked flask equipped with a stirrer, a thermometer, a reflux condenser, and a nitrogen gas introduction tube, and was heated to 65° C. under a nitrogen atmosphere.

To the flask, 30.0 g of methyl methacrylate, 6.5 g of ethyl acrylate, 13.5 g of acrylamido-2-methylpropane sulfonic acid, 30 g of isopropyl alcohol, 15 g of water, and 2.97 g ((0.0129 moles); 3% by mol with respect to the total molar number (0.430 moles) of monomers) of V-601 (polymerization initiator, manufactured by Wako Pure Chemical Industries, Ltd.)) were dropped at a constant speed so that the dropping was completed in two hours.

After the completion of the dropping, the resultant mixture was stirred for 2 hours, and 1.48 g of V-601 (1.5% by mol with respect to the total molar number of the monomers) and 3.0 g of isopropyl alcohol were added thereto, followed by stirring the mixture for 2 hours.

The obtained polymer solution was neutralized using an aqueous solution of sodium hydroxide equimolar to the acrylamido-2-methylpropane sulfonic acid used above, isopropyl alcohol was distilled off under reduced pressure, thereby concentrating the solution, and water was added thereto such that the total amount of the polymer solution became 310 g, whereby a polymer aqueous solution containing 16% by mass of the water-soluble polymer was obtained.

The weight average molecular weight (Mw) of the obtained water-soluble polymer was found to be 45,000. Here, the weight average molecular weight was measured by the above-described method.

Example 1 to Example 14 and Comparative Example 1 to Comparative Example 5

<Ink Set>

The above ink 1 (magenta ink M1, black ink K1, cyan ink C1, yellow ink Y1) and each of the treatment solutions (treatment solution 1 to treatment solution 19) were combined as indicated in Table 2 and Table 3 below, to obtain ink set 1 to ink set 19.

<Image Formation>

As substrates, coated paper A (MagnoStarGloss manufactured by Sappi; exhibiting a contact angle of 85° three seconds after depositing a water drop to the surface thereof), coated paper B (CartaIntegra manufactured by Metsaboard; exhibiting a contact angle of 74° three seconds after applying a water drop to the surface thereof), and coated paper C (OK Top coat+ manufactured by OJI PAPER CO., LTD., exhibiting a contact angle of 54° three seconds after depositing a water drop to the surface thereof) were used, and images were formed under the following conditions using ink set 1 to ink set 19 indicated in Table 2 and Table 3 below.

In the image forming described below, the deposition of the ink was initiated within 10 seconds after applying the treatment solution.

The contact angle between the substrate and water was measured in accordance with the method described in JIS R3257 using a contact angle meter Drop master DM700 (manufactured by Kyowa Interface Science Co.). The amount of a water droplet was adjusted to 2 μl, and the contact angle on the substrate was measured 3 seconds after dropping the water droplet.

(Pre-Treatment Process)

Right before application of the ink to a substrate, the treatment solution was applied to the substrate using a coating bar. The coating amount of the treatment solution was 1.7 g/m$^2$.

Thereafter, the treatment solution applied to the substrate was dried under the following conditions.

—Drying Conditions for Treatment Solutions (Air Blowing Drying)—

Wind speed: 15 m/s

Temperature and heating method: the back surface of the substrate (the surface on which the treatment solution had not been applied) was heated by a contact-type flat heater such that the surface temperature of the substrate (temperature at the surface on which the treatment solution had been applied) was 60° C.

Wind blowing area: 450 mm (Drying time was 0.7 second)

(Image Forming Process)

On the substrate to which the treatment solution had been applied, an image was formed using inks of four colors (magenta ink M1, black ink K1, cyan ink C1, and yellow ink Y1) by a single pass method under the following condition. Specifically, on the surface of the substrate on which the treatment solution had been applied, inks of the respective colors were applied (deposited) under the following conditions to form an image.

<Conditions>

Head: Head equipped with a piezo-full-line head having 1,200 dpi (dot per inch)/20 inch width for 4 colors.

Ejection droplet amount: 2.4 pL.

Operation frequency: 30 kHz (substrate returning rate of 635 mm/sec).

Next, the inks deposited on the substrate were dried under the following conditions.

—Drying Conditions for Ink (Air Blowing Drying)—

Wind speed: 15 m/s

Temperature: The back surface of the substrate (a surface on which the ink had not been applied) was heated by a contact-type flat heater such that the surface temperature of the substrate (temperature at the surface on which the ink was applied) was 60° C.

Wind blowing area: 640 mm (drying time was 1 second)

(Heating and Fixing Process)

The image formed by application of the above-described ink was heated and fixed under the following conditions using a silicone rubber roller (hardness: 50°, nip width: 5 mm), as a result of which a sample having an image formed on the substrate was obtained.

—Conditions for Heating and Fixing—

Roller temperature: 90° C.

Pressure: 0.8 MPa

<Evaluation>

The following evaluation for the sample obtained in the above was performed. The evaluations results are listed in Table 2 and Table 3 below.

—1. Graininess of Image—

In the image forming process described above, a magenta ink was applied in solid form to the surface of the substrate on which the treatment solution had been applied, to form a solid image having magenta color, and a cyan ink was deposited thereon in dots so that the dot percent was 50% to 80%, as a result of which a two-colored image was obtained. The obtained two-colored image was subjected to the above-described heat-fixing treatment. The two-colored image after the heat-fixing treatment was observed with the naked eye, and the image graininess was determined in accordance with the following criteria.

<Evaluation Criteria>

5: The entire area was homogeneous without any graininess observed.

4: The entire area was almost homogeneous, although slight graininess was observed.

3: Slight graininess was observed, but there would be no problem for practical use.
2: Graininess was significant and clearly visible, and there would be a problem for practical use.
1: Graininess with significant density difference occurred, and the image was far from homogeneous.

—2. Stripe-Shaped Unevenness—

In the above-described image forming process, a black ink was applied in solid form to the substrate surface on which the treatment solution had been applied, to form a solid image having black color. A printed matter was obtained thereby. The printed matter with an image formed thereon was observed with the naked eye, and the absence or presence of stripe-shaped unevenness in the carrying direction of the printed matter and the degree of stripe-shaped unevenness were evaluated according to the following criteria.

Stripe-shaped unevenness tends to occur when the ejection direction distortion at the inkjet ejection head is large. When the dots are small, the stripe pattern caused by the ejection direction distortion tends to have high visibility. When the ink set has a low aggregating property, a deposition interference with neighboring dots is caused and the color of a substrate (white background) tends to appear, whereby the stripe-shaped unevenness occurs.

<Evaluation Criteria>
5: Stripe-shaped unevenness in a printed matter is not observed.
4: One extremely thin stripe pattern is observed in terms of stripe-shaped unevenness in a printed matter, but it is at the practically acceptable level.
3: Several extremely thin stripe patterns are observed in terms of stripe-shaped unevenness in a printed matter, but it is within the lower practically acceptable level.
2: Several stripe patterns are easily observed in terms of stripe-shaped unevenness in a printed matter, and it is not practically acceptable.
1: Lots of stripe patterns are easily observed in terms of stripe-shaped unevenness in a printed matter, and it is not practically acceptable.

—3. Density of Solid Image—

In the above-described image forming process, a black ink was applied in solid form to the substrate surface on which the treatment solution had been applied, to form a solid image having black color. A printed matter was obtained thereby. The density of the solid image part in the printed matter with the image formed thereon was measured in terms of visual density (V density) using a spectrophotometer SpectroEye (manufactured by Sakata Inx Corporation).

When the ink dots are small after deposition and aggregation, the density of a solid image is low due to a white background. Furthermore, when the aggregation ability of the ink set is low, deposition interference with neighboring ink dots occurs, whereby the white background is more visible, and the image density decreases. Meanwhile, in the following evaluation criteria, ranks 5, 4, and 3 are at practically acceptable level, and ranks 2 and 1 are at practically unacceptable level.

<Evaluation Criteria>
5: Image density of solid image in printed matter is more than 1.9.
4: Image density of solid image in printed matter is from more than 1.7 to 1.9.
3: Image density of solid image in printed matter is from more than 1.5 to 1.7.
2: Image density of solid image in printed matter is from more than 1.3 to 1.5.
1: Image density of solid image in printed matter is 1.3 or less.

—4. Image Defect—

Formation of a two-colored image was continuously performed on 100 substrate sheets in the same manner as in the evaluation of graininess of image, and thus a printed matter was obtained.

For each of the 100 printed sheets on which a two-colored image had been formed, the two-colored image was observed with the naked eye, and the presence or absence of an image defect due to bubbles in the treatment solution was determined.

For the 100 printed sheets on which a two-colored image had been formed, the proportion of image defects was determined, and evaluation was performed according to the following criteria.

<Evaluation Criteria>
5: Of the 100 printed sheets, the number of sheets having an image defect was 0.
4: Of the 100 printed sheets, the number of sheets having an image defect was from 1 to 2.
3: Of the 100 printed sheets, the number of sheets having an image defect was from 3 to 5.
2: Of the 100 printed sheets, the number of sheets having an image defect was from 6 to 10.
1: Of the 100 printed sheets, the number of sheets having an image defect was more than 10.

TABLE 2

| | | | Comparative Example 1 | Comparative Example 2 | Comparative Example 3 | Example 1 | Example 2 |
|---|---|---|---|---|---|---|---|
| | | Ink Set | Ink Set 1 | Ink Set 2 | Ink Set 3 | Ink Set 4 | Ink Set 5 |
| | | Ink | Ink 1 | Ink 1 | Ink 1 | Ink 1 | Ink 1 |
| | | Treatment solution | Treatment solution 1 | Treatment solution 2 | Treatment solution 3 | Treatment solution 4 | Treatment solution 5 |
| Treatment solution Composition (% by mass) | Organic Solvent | Diethylene Glycol Monoethyl Ether | | 4 | 4 | 4 | 4 |
| | | Tripropylene Glycol Monomethyl Ether | | 4 | 4 | 4 | 4 |
| | | 2-Propanol | 5 | | | | |
| | | Propylene Glycol | 10 | | | | |
| | Aggregating Compound | 1,2,3-Propane Tricarboxylic Acid | | 2.6 | 2.6 | 2.6 | 2.6 |
| | | Malonic Acid | | 7.3 | 7.3 | 7.3 | 7.3 |
| | | Malic Acid | | 7.3 | 7.3 | 7.3 | 7.3 |
| | | Phosphoric Acid | | 4.3 | 4.3 | 4.3 | 4.3 |
| | | Polyallylamine | 3 | | | | |

TABLE 2-continued

|  |  |  |  |  |  |  |
|---|---|---|---|---|---|---|
|  | Water-Soluble Polymer |  | 2.5 | 2.5 | 2.5 | 2.5 |
|  | Benzotriazole |  | 1 | 1 | 1 | 1 |
| Surfactant | Anionic Surfactant 1 |  |  |  | 0.1 | 0.5 |
|  | Anionic Surfactant 2 |  |  |  |  |  |
|  | Anionic Surfactant 3 | 20 |  |  |  |  |
|  | Cationic Surfactant | 1 |  |  |  |  |
|  | Nonionic Surfactant |  |  | 1 |  |  |
|  | Silicone Emulsion Solid Content 15% by mass |  |  |  | 0.1 | 0.1 |
|  | Ion Exchange Water | 61 | 67 | 66 | 66.8 | 66.4 |
| Content A of Aggregating Compound (% by mass) |  | 3 | 21.5 | 21.5 | 21.5 | 21.5 |
| Content B of Anionic Surfactant (% by mass) |  | 20 | 0 | 0 | 0.1 | 0.5 |
| B/A |  | 6.667 | 0.000 | 0.000 | 0.005 | 0.023 |
| Content C* of Silicone Emulsion (% by mass) |  | 0 | 0 | 0 | 0.015 | 0.015 |
| C/B |  | 0 | — | — | 0.15 | 0.03 |
| Total Content D of Resin Particles and Colorant in Ink Composition (% by mass) |  | 14 | 14 | 14 | 14 | 14 |
| D/A |  | 4.67 | 0.65 | 0.65 | 0.65 | 0.65 |
| Evaluation Result | Coated Paper A Graininess | 2 | 3 | 3 | 3 | 5 |
|  | Stripe-Shaped Unevenness | 1 | 1 | 1 | 3 | 5 |
|  | Concentration of Solid Image | 1 | 1 | 1 | 3 | 5 |
|  | Image Defect | 1 | 4 | 4 | 4 | 4 |
|  | Coated Paper B Graininess | 2 | 3 | 3 | 3 | 5 |
|  | Stripe-Shaped Unevenness | 1 | 2 | 2 | 3 | 5 |
|  | Density of Solid Image | 1 | 2 | 2 | 3 | 5 |
|  | Coated Paper C Graininess | 3 | 5 | 5 | 5 | 5 |
|  | Stripe-Shaped Unevenness | 3 | 5 | 5 | 5 | 5 |
|  | Density of Solid Image | 3 | 5 | 5 | 5 | 5 |

|  |  |  | Example 3 | Example 4 | Example 5 | Example 6 | Comparative Example 4 |
|---|---|---|---|---|---|---|---|
|  |  | Ink Set | Ink Set 6 | Ink Set 7 | Ink Set 8 | Ink Set 9 | Ink Set 10 |
|  |  | Ink | Ink 1 | Ink 1 | Ink 1 | Ink 1 | Ink 1 |
|  |  | Treatment solution | Treatment solution 6 | Treatment solution 7 | Treatment solution 8 | Treatment solution 9 | Treatment solution 10 |
| Treatment solution Composition (% by mass) | Organic Solvent | Diethylene Glycol Monoethyl Ether | 4 | 4 | 4 | 4 | 4 |
|  |  | Tripropylene Glycol Monomethyl Ether | 4 | 4 | 4 | 4 | 4 |
|  |  | 2-Propanol |  |  |  |  |  |
|  |  | Propylene Glycol |  |  |  |  |  |
|  | Aggregating Compound | 1,2,3-Propane Tricarboxylic Acid | 2.6 | 2.6 | 2.6 | 2.6 | 2.6 |
|  |  | Malonic Acid | 7.3 | 7.3 | 7.3 | 7.3 | 7.3 |
|  |  | Malic Acid | 7.3 | 7.3 | 7.3 | 7.3 | 7.3 |
|  |  | Phosphoric Acid | 4.3 | 4.3 | 4.3 | 4.3 | 4.3 |
|  |  | Polyallylamine |  |  |  |  |  |
|  |  | Water-Soluble Polymer | 2.5 | 2.5 | 2.5 | 2.5 | 2.5 |
|  |  | Benzotriazole | 1 | 1 | 1 | 1 | 1 |
|  | Surfactant | Anionic Surfactant 1 | 1 | 5 | 10 | 12.5 | 15 |
|  |  | Anionic Surfactant 2 |  |  |  |  |  |
|  |  | Anionic Surfactant 3 |  |  |  |  |  |
|  |  | Cationic Surfactant |  |  |  |  |  |
|  |  | Nonionic Surfactant |  |  |  |  |  |
|  |  | Silicone Emulsion Solid Content 15% by mass | 0.1 | 0.1 | 0.1 | 0.1 | 0.1 |
|  |  | Ion Exchange Water | 65.9 | 61.9 | 56.9 | 45.5 | 51.9 |
| Content A of Aggregating Compound (% by mass) |  |  | 21.5 | 21.5 | 21.5 | 21.5 | 21.5 |
| Content B of Anionic Surfactant (% by mass) |  |  | 1 | 5 | 10 | 12.5 | 15 |
| B/A |  |  | 0.047 | 0.233 | 0.465 | 0.581 | 0.698 |
| Content C* of Silicone Emulsion (% by mass) |  |  | 0.015 | 0.015 | 0.015 | 0.015 | 0.015 |
| C/B |  |  | 0.015 | 0.003 | 0.0015 | 0.001 | 0.001 |
| Total Content D of Resin Particles and Colorant in Ink Composition (% by mass) |  |  | 14 | 14 | 14 | 14 | 14 |
| D/A |  |  | 0.65 | 0.65 | 0.65 | 0.65 | 0.65 |
| Evaluation Result | Coated Paper A | Graininess | 5 | 5 | 3 | 3 | 2 |
|  |  | Stripe-Shaped Unevenness | 5 | 5 | 4 | 4 | 3 |
|  |  | Concentration of Solid Image | 5 | 5 | 4 | 3 | 2 |
|  |  | Image Defect | 4 | 4 | 3 | 3 | 2 |
|  | Coated Paper B | Graininess | 5 | 5 | 4 | 3 | 2 |
|  |  | Stripe-Shaped Unevenness | 5 | 5 | 4 | 4 | 3 |
|  |  | Density of Solid Image | 5 | 5 | 5 | 5 | 3 |
|  | Coated Paper C | Graininess | 5 | 5 | 5 | 5 | 3 |
|  |  | Stripe-Shaped Unevenness | 5 | 5 | 5 | 5 | 4 |
|  |  | Density of Solid Image | 5 | 5 | 5 | 5 | 3 |

*Content C of silicone emulsion is represented in % by mass.

TABLE 3

| | | | Example 7 | Example 8 | Comparative Example 5 | Example 9 | Example 10 |
|---|---|---|---|---|---|---|---|
| | | Ink Set | Ink Set 11 | Ink Set 12 | Ink Set 13 | Ink Set 14 | Ink Set 15 |
| | | Ink | Ink 1 | Ink 1 | Ink 1 | Ink 1 | Ink 1 |
| | | Treatment solution | Treatment Solution 11 | Treatment solution 12 | Treatment solution 13 | Treatment solution 14 | Treatment solution 15 |
| Treatment solution Composition (% by mass) | Organic Solvent | Diethylene Glycol Monoethyl Ether | 4 | 4 | 4 | 4 | 4 |
| | | Tripropylene Glycol Monomethyl Ether | 4 | 4 | 4 | 4 | 4 |
| | | 2-Propanol | | | | | |
| | | Propylene Glycol | | | | | |
| | Aggregating Compound | 1,2,3-Propane Tricarboxylic Acid | 1.3 | 1.3 | 1.3 | 2.6 | 2.6 |
| | | Malonic Acid | 3.7 | 3.7 | 3.7 | 7.3 | 7.3 |
| | | Malic Acid | 3.7 | 3.7 | 3.7 | 7.3 | 7.3 |
| | | Phosphoric Acid | 2.2 | 2.2 | 2.2 | 4.3 | 4.3 |
| | | Polyallylamine | | | | | |
| | | Water-Soluble Polymer | 2.5 | 2.5 | 2.5 | 2.5 | 2.5 |
| | | Benzotriazole | 1 | 1 | 1 | 1 | 1 |
| | Surfactant | Anionic Surfactant 1 | 1 | 5 | 7.5 | | |
| | | Anionic Surfactant 2 | | | | 1 | |
| | | Anionic Surfactant 3 | | | | | 1 |
| | | Cationic Surfactant | | | | | |
| | | Nonionic Surfactant | | | | | |
| | | Silicone Emulsion Solid Content 15% by mass | 0.1 | 0.1 | 0.1 | 0.1 | 0.1 |
| | | Ion Exchange Water | 76.65 | 72.65 | 70.15 | 65.9 | 65.9 |
| | Content A of Aggregating Compound (% by mass) | | 10.75 | 10.75 | 10.75 | 21.5 | 21.5 |
| | Content B of Anionic Surfactant (% by mass) | | 1 | 5 | 7.5 | 1 | 1 |
| | B/A | | 0.093 | 0.465 | 0.698 | 0.047 | 0.047 |
| | Content C* of Silicone Emulsion (% by mass) | | 0.015 | 0.015 | 0.015 | 0.015 | 0.015 |
| | C/B | | 0.015 | 0.003 | 0.002 | 0.015 | 0.015 |
| | Total Content D of Resin Particles and Colorant in Ink Composition (% by mass) | | 14 | 14 | 14 | 14 | 14 |
| | D/A | | 1.30 | 1.30 | 1.30 | 0.65 | 0.65 |
| Evaluation Result | Coated Paper A | Graininess | 4 | 3 | 2 | 4 | 5 |
| | | Stripe-Shaped Unevenness | 4 | 4 | 3 | 4 | 4 |
| | | Density of Solid Image | 4 | 4 | 3 | 4 | 4 |
| | | Image Defect | 4 | 4 | 3 | 5 | 4 |
| | Coated Paper B | Graininess | 4 | 3 | 2 | 5 | 5 |
| | | Stripe-Shaped Unevenness | 4 | 4 | 3 | 5 | 5 |
| | | Density of Solid Image | 4 | 4 | 3 | 5 | 5 |
| | Coated Paper C | Graininess | 4 | 3 | 3 | 5 | 5 |
| | | Stripe-Shaped Unevenness | 4 | 4 | 3 | 5 | 5 |
| | | Density of Solid Image | 4 | 4 | 3 | 5 | 5 |

| | | | Example 11 | Example 12 | Example 13 | Example 14 |
|---|---|---|---|---|---|---|
| | | Ink Set | Ink Set 16 | Ink Set 17 | Ink Set 18 | Ink Set 19 |
| | | Ink | Ink 1 | Ink 1 | Ink 1 | Ink 1 |
| | | Treatment solution | Treatment solution 16 | Treatment solution 17 | Treatment solution 18 | Treatment solution 19 |
| Treatment solution Composition (% by mass) | Organic Solvent | Diethylene Glycol Monoethyl Ether | 4 | 4 | 4 | 4 |
| | | Tripropylene Glycol Monomethyl Ether | 4 | 4 | 4 | 4 |
| | | 2-Propanol | | | | |
| | | Propylene Glycol | | | | |
| | Aggregating Compound | 1,2,3-Propane Tricarboxylic Acid | 2.6 | 2.6 | 2.6 | |
| | | Malonic Acid | 7.3 | 7.3 | 7.3 | |
| | | Malic Acid | 7.3 | 7.3 | 7.3 | |
| | | Phosphoric Acid | 4.3 | 4.3 | 4.3 | |
| | | Polyallylamine | | | | 20 |
| | | Water-Soluble Polymer | 2.5 | 2.5 | 2.5 | |
| | | Benzotriazole | 1 | 1 | 1 | 1 |
| | Surfactant | Anionic Surfactant 1 | 1 | 1 | 1 | 1 |
| | | Anionic Surfactant 2 | | | | |
| | | Anionic Surfactant 3 | | | | |
| | | Cationic Surfactant | | | | |
| | | Nonionic Surfactant | | | | |
| | | Silicone Emulsion Solid Content 15% by mass | 0.01 | 0.5 | 1 | 0.1 |
| | | Ion Exchange Water | 65.99 | 65.5 | 65 | 69.9 |
| | Content A of Aggregating Compound (% by mass) | | 21.5 | 21.5 | 21.5 | 20 |
| | Content B of Anionic Surfactant (% by mass) | | 1 | 1 | 1 | 1 |
| | B/A | | 0.047 | 0.047 | 0.047 | 0.050 |

TABLE 3-continued

| | | | | | | |
|---|---|---|---|---|---|---|
| | Content C* of Silicone Emulsion (% by mass) | | 0.0015 | 0.075 | 0.15 | 0.015 |
| | C/B | | 0.0015 | 0.075 | 0.15 | 0.015 |
| | Total Content D of Resin Particles and Colorant in Ink Composition (% by mass) | | 14 | 14 | 14 | 14 |
| | D/A | | 0.65 | 0.65 | 0.65 | 0.70 |
| Evaluation Result | Coated Paper A | Graininess | 5 | 4 | 3 | 3 |
| | | Stripe-Shaped Unevenness | 5 | 5 | 4 | 3 |
| | | Density of Solid Image | 5 | 4 | 3 | 3 |
| | | Image Defect | 3 | 5 | 5 | 4 |
| | Coated Paper B | Graininess | 5 | 4 | 4 | 3 |
| | | Stripe-Shaped Unevenness | 5 | 5 | 4 | 3 |
| | | Density of Solid Image | 5 | 4 | 4 | 3 |
| | Coated Paper C | Graininess | 5 | 5 | 5 | 4 |
| | | Stripe-Shaped Unevenness | 5 | 5 | 5 | 4 |
| | | Density of Solid Image | 5 | 5 | 5 | 4 |

*Content C of silicone emulsion is represented in % by mass.

Details of the components that are listed in Table 2 and Table 3 are described below.

Anionic surfactant 1 . . . sodium dodecylbenzene sulfonate (the total number of carbon atoms in the hydrocarbon group: 18, a compound represented by General Formula (1), molecular weight: 348.5)

Anionic surfactant 2 . . . sodium lauryl sulfate (the total number of carbon atoms in the hydrocarbon group: 12, a compound represented by General Formula (1), molecular weight: 288.4)

Anionic surfactant 3 . . . sodium di-2-ethylhexyl sulfosuccinate (the total number of carbon atoms in the two hydrocarbon groups (ethylhexyl groups): 16, a compound represented by General Formula (2), molecular weight: 444.6)

Cationic surfactant . . . an aqueous solution of the compound having the following structure with a solid content of 25% by mass Nonionic surfactant . . . Olfin E1010 (manufactured by Nissin Chemical Co., Ltd.)

Silicone emulsion . . . TSA-739 (solid content: 15% by mass) (an emulsion type silicone anti-foaming agent manufactured by Momentive Performance Materials Japan Limited Liability Co., solid component: silicone resin particles, and silica particles)

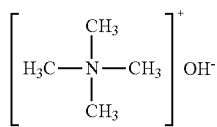

Cationic Surfactant

As demonstrated in Table 2 and Table 3, it was found that all of the ink sets of Examples provided an image in which graininess, stripe-shaped unevenness, and density decrease in a solid image were suppressed compared to an image obtained from the ink set of Comparative Examples.

By comparing the ink sets of Example 2 to Example 4 with the ink sets of Example 1 and Example 5, it was found that, when B/A is within a range of 0.010 to 0.250, an image in which graininess, stripe-shaped unevenness, and density decrease in a solid image were further suppressed can be obtained.

Examples 15 to 21

Coated paper B was used as a substrate. Using Ink set 4, treatment solution 4 was applied to coated paper B, and an image was formed at the surface on which the treatment solution was applied (image forming process), in the same manner as in Example 1. Then, post-treatment was performed using the coating solution described below.

(1) Preparation of Coating Liquids 1 to 7

First, the components listed in the following Table 4 were mixed to prepare coating solutions (application solution) 1 to 7.

HYDLITH 2012 R1 (manufactured by DIC) listed in Table 4 contains a styrene-acryl resin in which (meth)acrylic acid, a (meth)acrylic acid ester, and styrene have been copolymerized.

(2) Post-Treatment

After forming an image through the image forming process, post-treatment was performed by coating any one of the coating solutions 1 to 7 on the image-formed surface of the substrate, on which an image had been formed, using DigiCoaterPOD (manufactured by TOYOTEC Co., Ltd.), to obtain a sample in which the image on the substrate was coated. In the post treatment, the coating solution was applied to the entire image-formed surface such that the application amount thereof was 5 g/m².

Next, the coating solution deposited on the substrate was dried under the following conditions.

—Drying Conditions—

Temperature: The surface of the substrate was heated by an infrared heater such that the surface temperature of the substrate became 40° C.

Conveyancing speed: 30 m/min.

<Evaluation>

The following evaluation was made with respect to the samples obtained in the above. Evaluation results are indicated in the following Table 4.

—5. Glossiness of Image and Non-Image Part (White Background Part)—

In the image forming process, the black ink was applied in dots to the surface of a substrate on which the treatment solution had been applied, whereby a gradation image having a dot percentage varying from 0% to 100% was obtained. The gloss level for each gradation including the non-image part (white background part) of the obtained image was measured using a BYK Gardner Tri Gloss meter (manufactured by TOYO SEIKI SEISAKU-SHO, LTD.), and the gloss level under the condition of a reflection angle of 60° was determined.

The difference between the maximum value and the minimum value of the gloss level is preferably 10 or less, since a difference in gloss becomes visible in an image when the difference in gloss level in the gradation image is large. It is also preferable that the absolute value of the gloss level is large.

TABLE 4

| | | | Example 15 | Example 16 | Example 17 | Example 18 |
|---|---|---|---|---|---|---|
| | Ink | | Ink 1 | Ink 1 | Ink 1 | Ink 1 |
| | Treatment solution | | Treatment Solution 4 | Treatment Solution 4 | Treatment Solution 4 | Treatment Solution 4 |
| | Coating Solution | | Coating Solution 1 | Coating Solution 2 | Coating Solution 3 | Coating Solution 4 |
| Coating Solution Composition (% by mass) | Aqueous Coating Solution | HYDLITH 2012R1 (manufactured by DIC) | 90 | 90 | 90 | 90 |
| | Alkali Component | 2-Amino-2-methyl-1-propanol | | 1 | 2 | 4 |
| | | Dimethylaminoethanol | | | | |
| | | Monoethanolamine | | | | |
| | | Potassium Carbonate | | | | |
| | | Water | 10 | 9 | 8 | 6 |
| Evaluation Result | Gloss Level [60°] | Minimum Value of 0% to 100% Gradation Image | 28 | 36 | 43 | 50 |
| | | Maximum Value of 0% to 100% Gradation Image | 45 | 46 | 50 | 51 |
| | Δ Gloss Level | Maximum value − Minimum value | 17 | 10 | 7 | 1 |

| | | | Example 19 | Example 20 | Example 21 |
|---|---|---|---|---|---|
| | Ink | | Ink 1 | Ink 1 | Ink 1 |
| | Treatment solution | | Treatment Solution 4 | Treatment Solution 4 | Treatment Solution 4 |
| | Coating Solution | | Coating Solution 5 | Coating Solution 6 | Coating Solution 7 |
| Coating Solution Composition (% by mass) | Aqueous Coating Solution | HYDLITH 2012R1 (manufactured by DIC) | 90 | 90 | 90 |
| | Alkali Component | 2-Amino-2-methyl-1-propanol | | | |
| | | Dimethylaminoethanol | 4 | | |
| | | Monoethanolamine | | 3 | |
| | | Potassium Carbonate | | | 6 |
| | | Water | 6 | 7 | 4 |
| Evaluation Result | Gloss Level [60°] | Minimum Value of 0% to 100% Gradation Image | 50 | 50 | 50 |
| | | Maximum Value of 0% to 100% Gradation Image | 52 | 51 | 50 |
| | Δ Gloss Level | Maximum value − Minimum value | 2 | 1 | 0 |

Application of a coating solution enables the gloss level of the image-formed surface to be enhanced. In particular, the printed matter after coating in Examples 16 to 21 has a small difference between the maximum value and minimum value of gloss level as indicated in Table 4, and is found to have further improved glossiness compared to the printed matter of Example 15. It is found that inclusion of an alkali component in the coating solution enables glossiness to be more enhanced and a printed matter to have still higher quality.

The invention claimed is:
1. An ink set comprising:
an ink composition comprising resin particles, a colorant, and water; and
a treatment solution comprising an anionic surfactant, water, and a compound configured to aggregate at least one of the colorant or the resin particles in the ink composition, wherein a ratio of a content of the anionic surfactant with respect to a content of the compound configured to aggregate at least one of the colorant or the resin particles is 0.001 to 0.600 in terms of mass; and wherein the treatment solution further comprises at least one selected from the group consisting of silicone resin particles and silica particles, and
a ratio of a total content of the silicone resin particles and the silica particles with respect to a content of the anionic surfactant is from 0.003 to 0.10 in terms of mass.
2. The ink set according to claim 1, wherein the anionic surfactant has a hydrocarbon group in the structure thereof and a total number of carbon atoms of the hydrocarbon group is 6 or more.
3. The ink set according to claim 1, wherein the anionic surfactant comprises at least one selected from the group consisting of a sulfonic acid salt and a sulfuric acid ester salt.
4. The ink set according to claim 1, wherein the anionic surfactant is at least one selected from the group consisting of a compound represented by the following General Formula (1) and a compound represented by the following General Formula (2)

$$R_1\text{-}L_1\text{-}A \quad \text{General Formula (1)}$$

wherein, in General Formula (1), $R_1$ represents a branched or linear alkyl group having 6 or more carbon atoms, an unsubstituted naphthyl group, an unsubstituted phenyl group, a naphthyl group substituted with at least one branched or linear alkyl group, or a phenyl group substituted with at least one branched or linear alkyl group; $L_1$ represents a single bond, an ester bond, an ether bond, an amide bond, an N-alkylamide bond, or at least one linking group selected from the following Group a; A represents $SO_3M$ or $OSO_3M$; and M represents a sodium ion or a potassium ion:

Group a

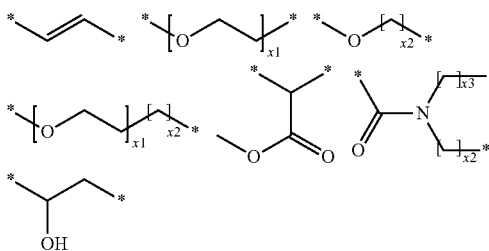

wherein, in Group a, each x1 and each x2 represents an integer from 1 to 30; x3 represents an integer from 0 to 30; and * represents a linking position General Formula (2)

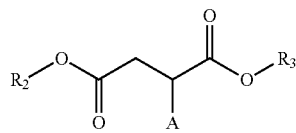

wherein, in General Formula (2), each $R_2$ and each $R_3$ independently represents a branched or linear alkyl group having 3 or more carbon atoms, an unsubstituted naphthyl group, an unsubstituted phenyl group, a naphthyl group substituted with at least one branched or linear alkyl group, or a phenyl group substituted with at least one branched or linear alkyl group; A represents $SO_3M$ or $OSO_3M$; and M represents a sodium ion or a potassium ion.

5. The ink set according to claim 1, wherein the ratio of the content of the anionic surfactant with respect to the content of the compound configured to aggregate at least one of the colorant or the resin particles is from 0.010 to 0.250 in terms of mass.

6. The ink set according to claim 1, wherein the anionic surfactant is sodium dodecylbenzene sulfonate.

7. The ink set according to claim 1, wherein the compound configured to aggregate at least one of the colorant or the resin particles is an organic acid.

8. An image forming method comprising:
a pre-treatment process of applying the treatment solution of the ink set according to claim 1 to at least one surface of a substrate, the at least one surface of the substrate having a contact angle of 70° or more when 3 seconds have elapsed after a water drop is applied thereto; and
an image forming process of forming an image by ejecting the ink composition of the ink set according to claim 1 to the at least one surface of the substrate to which the treatment solution has been applied, using an inkjet method.

9. The image forming method according to claim 8, wherein the substrate is a paper substrate having a coating layer.

* * * * *